United States Patent
Medard et al.

(10) Patent No.: US 11,226,951 B2
(45) Date of Patent: Jan. 18, 2022

(54) STORAGE-OPTIMIZED DATA-ATOMIC SYSTEMS AND TECHNIQUES FOR HANDLING ERASURES AND ERRORS IN DISTRIBUTED STORAGE SYSTEMS

(71) Applicants: Massachusetts Institute of Technology, Cambridge, MA (US); Northeastern University, Boston, MA (US); University of Connecticut, Farmington, CT (US)

(72) Inventors: Muriel Medard, Belmont, MA (US); Kishori Mohan Konwar, Revere, MA (US); Prakash Narayana Moorthy, Hillsboro, OR (US); Nancy Ann Lynch, Brookline, MA (US); Erez Kantor, Brookline, MA (US); Alexander Allister Schwarzmann, Storrs, CT (US)

(73) Assignees: Massachusetts Institute of Technology, Cambridge, MA (US); Northeastern University, Boston, MA (US); University of Connecticut, Farmington, CT (US)

( * ) Notice: Subject to any disclaimer, the term of this patent is extended or adjusted under 35 U.S.C. 154(b) by 0 days.

(21) Appl. No.: 17/101,400

(22) Filed: Nov. 23, 2020

(65) Prior Publication Data
US 2021/0191916 A1    Jun. 24, 2021

Related U.S. Application Data

(63) Continuation of application No. 15/838,966, filed on Dec. 12, 2017, now Pat. No. 10,872,072.
(Continued)

(51) Int. Cl.
*H04L 29/08* (2006.01)
*G06F 16/23* (2019.01)
(Continued)

(52) U.S. Cl.
CPC .......... *G06F 16/2329* (2019.01); *G06F 16/00* (2019.01); *G06F 16/27* (2019.01);
(Continued)

(58) Field of Classification Search
CPC ...... H04L 67/1097; H04L 69/26; G06F 3/067
See application file for complete search history.

(56) References Cited

U.S. PATENT DOCUMENTS 6,671,821 B1    12/2003  Castro et al.
7,376,092 B2     5/2008  Yajnik et al.
(Continued)

OTHER PUBLICATIONS

Attiya, et al., "Sharing Memory Robustly in Message-Passing Systems;" Laboratory for Computer Science, MIT; dated Feb. 16, 1990; 24 pages.
(Continued)

*Primary Examiner* — Nadeem Iqbal
(74) *Attorney, Agent, or Firm* — Daly, Crowley, Mofford & Durkee, LLP

(57) ABSTRACT

Described are devices, systems and techniques for implementing atomic memory objects in a multi-writer, multi-reader setting. In an embodiment, the devices, systems and techniques use maximum distance separable (MDS) codes, and may be specifically designed to optimize a total storage cost for a given fault-tolerance requirement. Also described is an embodiment to handle the case where some of the servers can return erroneous coded elements during a read operation.

20 Claims, 12 Drawing Sheets

Related U.S. Application Data

(60) Provisional application No. 62/432,825, filed on Dec. 12, 2016.

(51) Int. Cl.
    *G06F 16/27*    (2019.01)
    *H04L 29/06*    (2006.01)
    *G06F 16/00*    (2019.01)
    *G06F 3/06*    (2006.01)

(52) U.S. Cl.
    CPC .......... *H04L 67/1097* (2013.01); *H04L 69/26* (2013.01); *G06F 3/067* (2013.01)

(56) References Cited

U.S. PATENT DOCUMENTS

| | | | |
|---|---|---|---|
| 7,644,321 | B2 | 1/2010 | Barsness et al. |
| 7,823,012 | B2 | 10/2010 | Barsness et al. |
| 8,954,787 | B2 | 2/2015 | Gladwin et al. |
| 9,298,550 | B2 | 3/2016 | Gladwin et al. |
| 9,405,815 | B1 * | 8/2016 | Wei ...................... G06F 16/122 |
| 10,872,072 | B2 * | 12/2020 | Medard ................... G06F 16/00 |
| 2010/0037056 | A1 | 2/2010 | Follis et al. |
| 2012/0290877 | A1 | 11/2012 | Grube et al. |
| 2012/0290878 | A1 * | 11/2012 | Gladwin ............... G06F 11/076 714/20 |
| 2014/0082433 | A1 | 3/2014 | Anumalasetty et al. |
| 2018/0027074 | A1 * | 1/2018 | Collet ..................... G06F 12/10 709/212 |
| 2018/0165318 | A1 | 6/2018 | Medard et al. |

OTHER PUBLICATIONS

Borthakur, et al; "HDFS raid;" Hadoop Tutorial; Intro to HDFS; https://www.youtube.com/watch?v=TeeqmqTRD20; Hadoop Distributed File System (HDFS); Dec. 2, 2010.

DeCandia, et al.; "Dynamo: Amazon's Highly Available Key-value Store;" ACM SIGOPS Operating Systems Review; vol. 41; No. 6; pp. 205-220; dated Oct. 14-17, 2007; 16 pages.

Ghemawat, et al.; "The Google File System;" ACM SIGOPS Operating Systems Review; vol. 37; No. 5; Oct. 19-22, 2003; 15 pages.

Huang, et al.; "Erasure Coding in Windows Azure Storage;" 2012 USENIX Annual Technical Conference; (USENJX ATC 12); Jun. 2012; 12 pages.

Nightingale, et al.; "Flat Datacenter Storage;" USENIX Association, 10th USENIX Symposium on Operating Systems Design and Implementation (OSDI'12), Oct. 8-10, 2012; 15 pages.

Notice of Allowance dated Aug. 31, 2020 for U.S. Appl. No. 15/838,966; 5 Pages.

Office Action dated Oct. 18, 2019 for U.S. Appl. No. 15/838,966; 8 Pages.

Office Action dated Apr. 1, 2020 for U.S. Appl. No. 15/838,966; 7 Pages.

Response to Office Action dated Oct. 18, 2019 for U.S. Appl. No. 15/838,966, filed Jan. 20, 2020; 11 Pages.

Response to Office Action dated Apr. 1, 2020 for U.S. Appl. No. 15/838,966, filed Jun. 26, 2020; 10 Pages.

\* cited by examiner

STORAGE-OPTIMIZED DATA-ATOMIC SYSTEMS AND TECHNIQUES FOR HANDLING ERASURES AND ERRORS IN DISTRIBUTED STORAGE SYSTEMS

CROSS REFERENCE TO RELATED APPLICATIONS

This application is a continuation of U.S. application Ser. No. 15/838,966 filed Dec. 12, 2017, which claims the benefit of U.S. Provisional Application No. 62/432,825 filed Dec. 12, 2016. These applications are incorporated herein by reference in their entireties.

GOVERNMENT RIGHTS

This invention was made with Government support under Grant Nos. FA9550-13-1-0042 and FA9550-14-1-0403 awarded by the Air Force Office of Scientific Research. The Government has certain rights in the invention.

BACKGROUND

As is known in the art, there exists a class of storage systems referred to as distributed storage systems (DSSs). DSSs are typically built by connecting commodity hardware components where constant component failure is the norm and not an exception. DSSs can store massive datasets across several hundreds of servers and are increasingly being used for both industrial and scientific applications. Such systems reside, for example, in datacenters across the world and are deployed in commercial settings by industrial organizations such as Amazon, Google, Facebook, etc. to store user data and deploy applications such as social networks, file-sharing, secure financial transactions, etc.

A DSS typically includes storage nodes (or devices) as well as entities known as writers (or more simply writers) and readers (or more simply readers). Data is written and updated by such writers and read by readers. Writers and readers are together referred to as proxy clients of the storage system. Such readers and writers interface with end user clients on behalf of end users. End user clients issue read and/or write instructions to a DSS via a proxy reader and/or proxy writer, respectively (i.e. to either write data to or read data from storage).

In settings where several writers attempt to simultaneously update stored data (e.g. in response to instructions provided thereto by an end user client), there is potential for conflict on the version of data (e.g. the version of a file) that should be written. Similarly, in settings where several readers attempt to simultaneously retrieve stored data (e.g. in response to instructions provided thereto by a client), there is potential for conflict on the version of data (e.g. the version of a file) that should be returned to the end user client during read operations.

To address problems arising from such concurrent access of data by reader and writer clients, consistency rules are imposed and implemented algorithmically via software. One well-known consistency policy is known as strong consistency. At an application level, a strong consistency policy gives the end users of the DSS the impression of a single machine executing the concurrent read and write operations as if the executions take place one after another.

As noted above, however, in practical systems individual storage nodes typically used in DSSs are individually unreliable. Consequently, redundancy must be incorporated into processes that implement the consistency policy. One simple and commonly employed redundancy technique is to replicate the data in multiple storage nodes. Replication-based strategies, however, incur high storage costs, and demand high network bandwidth for read and write operations.

As is also known, erasure codes provide an alternative way to emulate fault-tolerant shared atomic storage. In comparison with replication, algorithms based on erasure codes significantly reduce both the storage and communication costs of the implementation. An [n,k] erasure code splits a value v of size 1 unit into k elements, each of size $$\frac{1}{k} \text{ units,}$$

creates n coded elements, and stores one coded element per server. The size of each coded element is also $$\frac{1}{k} \text{ units,}$$

and thus the total storage cost across the n servers is $$\frac{n}{k} \text{ units.}$$

A class of erasure codes known as Maximum Distance Separable (MDS) codes have the property that a value v can be reconstructed from any k out of these n coded elements. For example, to store a value of size 1 TB in a 100-server system using an [n=100, k=50] MDS code, the storage cost is simply 2 TB, which is almost two orders of magnitude lower than the storage in the case of other approaches (e.g. the so-called quorum-based replicated storage technique, in which the worst-case storage cost is 100 TB). In systems that are centralized and synchronous, the parameter k is simply chosen as n−f, where f denotes the number of server crash failures that need to be tolerated. In this case, the read cost, write cost and total storage cost can all be simultaneously optimized.

The use of MDS codes to emulate atomic shared storage in decentralized, asynchronous settings is challenging and often results in additional communication or storage costs for a given level of fault tolerance, when compared to the synchronous setting. Nevertheless, it has been shown that significant gains over replication-based strategies can still be achieved using erasure codes. Some systems utilize algorithms based on MDS codes for emulating fault-tolerant shared atomic storage and offer different trade-offs between storage and communication costs.

SUMMARY OF THE DISCLOSED EMBODIMENTS

In accordance with the disclosure herein, various embodiments use the Storage-Optimized Data-Atomic (SODA) algorithm for implementing atomic memory objects. SODA uses [n, k] MDS codes, and is specifically designed to optimize the total storage cost for a given fault tolerance level. The SODA algorithm may be modified to handle the case where some of the non-faulty servers can return erroneous coded elements during a read operation.

SODA assumes a distributed system consisting of asynchronous processes of three types: a set of readers and writers, called proxy clients, and a set of n servers. Each of these processes is associated with a unique identifier, and the sets of IDs of the readers, writers and servers are denoted as R, W and S, respectively. The set of IDs forms a totally ordered set. The reader and writer processes initiate read and write operations, respectively, and communicate with the servers using messages.

SODA also assumes reliable point-to-point communication channels between any two processes, whether they are readers, writers or servers. In a data storage network consisting of n data storage servers that tolerates f, $$1 \le f \le \frac{n-1}{2}$$

server crashes, SODA uses an [n,k] MDS code with k=n-f. Each server at any point during the execution of the algorithm stores at most one coded element, and thus, SODA has a worst-case total storage cost of $$\frac{n}{n-f}.$$

Any number of writer or reader processes may fail during the execution.

To implement the write and read operations in SODA, a message-disperse primitive is described. The primitive is used by a process p to disperse a message m to all the non-faulty servers. The message m can be either meta-data alone or one that involves the value v along with a tag (where the tag is used to identify the version associated with the value); slightly differing implementations are used in the two cases. Meta-data refers to data such as ids, tags etc. which are used by various operations for book-keeping. In situations where m consists only of meta-data, the primitive ensures that if a server s∈S receives m, then the same message m is sent by server s to every server s'∈S by some process in the set {p}∪S. Thus, if s' is non-faulty, it eventually receives m since the point-to-point channels are assumed reliable. During write operations, the writer uses the message-disperse primitive where m is the value v to be written. In this case, the primitive ensures that every non-faulty server receives the coded element that is targeted for local storage in that server. The primitive can tolerate up to f server failures and the failure of the process p. The idea here is to ensure that the unencoded value v is sent to f+1 servers, so that at least one non-faulty server receives v. This non-faulty server further computes and sends the corresponding coded elements to the remaining n-f servers.

The read operations in SODA use a reader-registration and relaying technique that provides crash fault tolerance. For successful decoding, a reader must collect k coded elements corresponding to one particular tag. The reader registers itself with all non-faulty servers, and these servers send their respective (locally stored) coded elements back to the reader. Further, each non-faulty server also sends to the reader the coded elements it receives as part of concurrent write operations. Such relaying, by the servers, is continued until the reader sends a message acknowledging read completion. SODA uses a server-to-server communication mechanism to handle the case where a reader might fail after invoking a read operation. This internal communication mechanism exchanges only metadata and ensures that no non-faulty server relays coded elements forever to any reader. No such mechanism is used in the prior art to handle the case of a failed reader.

As mentioned above, the SODA algorithm may be modified to handle the additional case where some of the servers can return erroneous coded elements during a read operation. This added feature of the algorithm is useful in large scale DDSs, where commodity hard disks are often used to achieve scalability of storage at low costs. In such systems, a coded element accessed by the server from its local hard-disk can be erroneous, i.e., the server obtains an arbitrary valued element instead of what was expected; however, the server is not aware of the error when it sends this element back to the reader. The modified algorithm provides a framework for tackling local disk read errors via the overall erasure code across the various servers, without the need for expensive error protection mechanisms locally at each server. Specifically, to tolerate f server failures (like in SODA) and e error-prone coded elements, the modification uses an [n,k] MDS code such that n-k=2e+f. It is assumed that no error occurs either in meta data or in temporary variables, since these are typically stored in volatile memory instead of local hard disk.

Therefore, a first embodiment is a method of transmitting a message, that pertains to a data storage protocol, throughout a data storage network having a plurality of data storage servers logically numbered 1 through n, of which at most f are faulty. The method comprises first receiving the message in a first data storage server. Next, each data storage server in the plurality, responsive to a first receiving of the message, performs two steps. The first step is, if the logical number of the responsive data storage server is no greater than f+1, forwarding the message to each data storage server having a logical number greater than that of the responsive data storage server. The second step is processing the message according to the data storage protocol.

The first embodiment may be modified in various ways. In a first variant, the message is associated with a reader and includes a tag that is totally orderable with respect to other such tags. In this variant, processing the message comprises registering the tag in association with the reader; and when the tag is not higher ordered than a previously stored tag, sending to the reader the previously stored tag and a previously stored coded element computed from a version of a value uniquely identified by the previously stored tag.

In a second variant, the message includes a version of a value to be written in the data storage network. In this variant, forwarding the message includes, for each data storage server having a logical number greater than f+1, replacing within the message the version of the value to be written by a coded element computed therefrom according to both an encoding scheme and the logical number of the respective data storage server. Also in this variant, processing the message comprises replacing within the message the version of the value to be written by a coded element computed therefrom according to both the encoding scheme and the logical number of the responsive data storage server.

The message may include a tag that is totally orderable with respect to other such tags, in which case processing the message may include relaying the tag and the coded element to a reader when the tag is at least as highly ordered as a tag previously registered in association with the reader. Moreover, processing the message may further include storing the tag and the coded element when the tag is higher ordered than a previously stored tag. The encoding scheme may use an [n, k] Maximum Distance Separable (MDS) code, where k≤n−f.

A second embodiment is a method of using a data storage network having a plurality of data storage servers logically numbered 1 through n, of which at most f are faulty. The method includes three steps performed by each data storage server having a logical number no greater than f+1, and one step performed by each data storage server having a logical number greater than f+1. Each of the first f+1 servers first performs the step receiving a first message that includes a version of a value to be stored in the data storage network. Each of the first f+1 servers second performs the step transmitting, to each data storage server having a logical number greater than f+1, a respective second message that includes a coded element computed from the version of the value according to both an encoding scheme and the logical number of the respective data storage server to which the second message is transmitted. Each of the first f+1 servers third performs the step storing a coded element computed from the version of the value according to both the encoding scheme and the logical number of the data storage server. Each of the remaining servers performs the step, responsive to a first receiving of the respective second message, storing the coded element included therein. In this way, each data storage server in the plurality stores exactly one coded element in association with the version of the value.

The second embodiment may be modified in various ways. A first variant further comprises performing three additional steps by each data storage server in the plurality. The first step is receiving a third message associated with a reader that includes a tag that is totally orderable with respect to other such tags. The second step is registering the tag in association with the reader. The third step is, when the tag is not higher ordered than a previously stored tag, sending to the reader the previously stored tag and a previously stored coded element computed according to the encoding scheme from a version of the value uniquely identified by the previously stored tag. The first variant may further comprise, by each data storage server in the plurality, informing each other data storage server in the plurality about such sending.

In a second variant, the first message includes a tag that is totally orderable with respect to other such tags, and storing the coded element includes relaying the tag and the coded element to a reader when the tag is at least as highly ordered as a tag previously registered in association with the reader. The second variant may further comprise informing each other data storage server in the plurality about such relaying. Alternately or in addition, storing the coded element may comprise storing only when the tag is higher ordered than a previously stored tag.

In the second embodiment, the encoding scheme may an [n, k] Maximum Distance Separable (MDS) code, where $k \leq n-f$.

A third embodiment is a method of transmitting a message, that pertains to a data storage protocol, throughout a data storage network having a plurality of n data storage servers, of which at most f are faulty. The method comprises first receiving the message in a first data storage server. Next, each data storage server in the plurality of n data storage servers, responsive to a first receiving of the message, performs two steps. The first step is, if the responsive data storage server is in a first subset having f+1 of the plurality of n data storage servers, forwarding the message to each data storage server in a respective second subset of the first subset, and forwarding the message to each of the data storage servers not in the first subset. The second step is processing the message according to the data storage protocol.

The third embodiment may be modified in various ways. In a first variant, the message is associated with a reader and includes a tag that is totally orderable with respect to other such tags. In this variant, processing the message comprises registering the tag in association with the reader; and when the tag is not higher ordered than a previously stored tag, sending to the reader the previously stored tag and a previously stored coded element computed from a version of a value uniquely identified by the previously stored tag.

In a second variant, the message includes a version of a value to be written in the data storage network. In this variant, forwarding the message to each of the data storage servers not in the first subset includes replacing within the message the version of the value to be written by a coded element computed therefrom according to an encoding scheme. Also in this variant, processing the message comprises replacing within the message the version of the value to be written by a coded element computed therefrom according to the encoding scheme.

The message may include a tag that is totally orderable with respect to other such tags, in which case processing the message may include relaying the tag and the coded element to a reader when the tag is at least as highly ordered as a tag previously registered in association with the reader.

A fourth embodiment is a method of using a data storage network having a plurality of n data storage servers, of which at most f are faulty. The method includes three steps performed by each data storage server in a given subset having f+1 of the plurality of n data storage servers, and one step performed by each data storage server not in the given subset. Each data storage server in the given subset first performs the step receiving a first message that includes a version of a value to be stored in the data storage network. Each data storage server in the given subset second performs the step transmitting, to each data storage server not in the given subset, a respective second message that includes a coded element computed from the version of the value according to an encoding scheme. Each data storage server in the given subset third performs the step storing a coded element computed from the version of the value according to the encoding scheme. Each data storage server not in the given subset performs the step, responsive to a first receiving of the respective second message, storing the coded element included therein.

The fourth embodiment may be modified in various ways. A first variant further comprises performing three additional steps by each data storage server in the plurality. The first step is receiving a third message associated with a reader that includes a tag that is totally orderable with respect to other such tags. The second step is registering the tag in association with the reader. The third step is, when the tag is not higher ordered than a previously stored tag, sending to the reader the previously stored tag and a previously stored coded element computed according to the encoding scheme from a version of the value uniquely identified by the previously stored tag.

The first message may include a tag that is totally orderable with respect to other such tags, and storing the coded element may include relaying the tag and the coded element to a reader when the tag is at least as highly ordered as a tag previously registered in association with the reader.

Additional embodiments may be described herein.

BRIEF DESCRIPTION OF THE DRAWINGS

The foregoing features may be more fully understood from the following description of the drawings in which.

DETAILED DESCRIPTION

Figure 1:
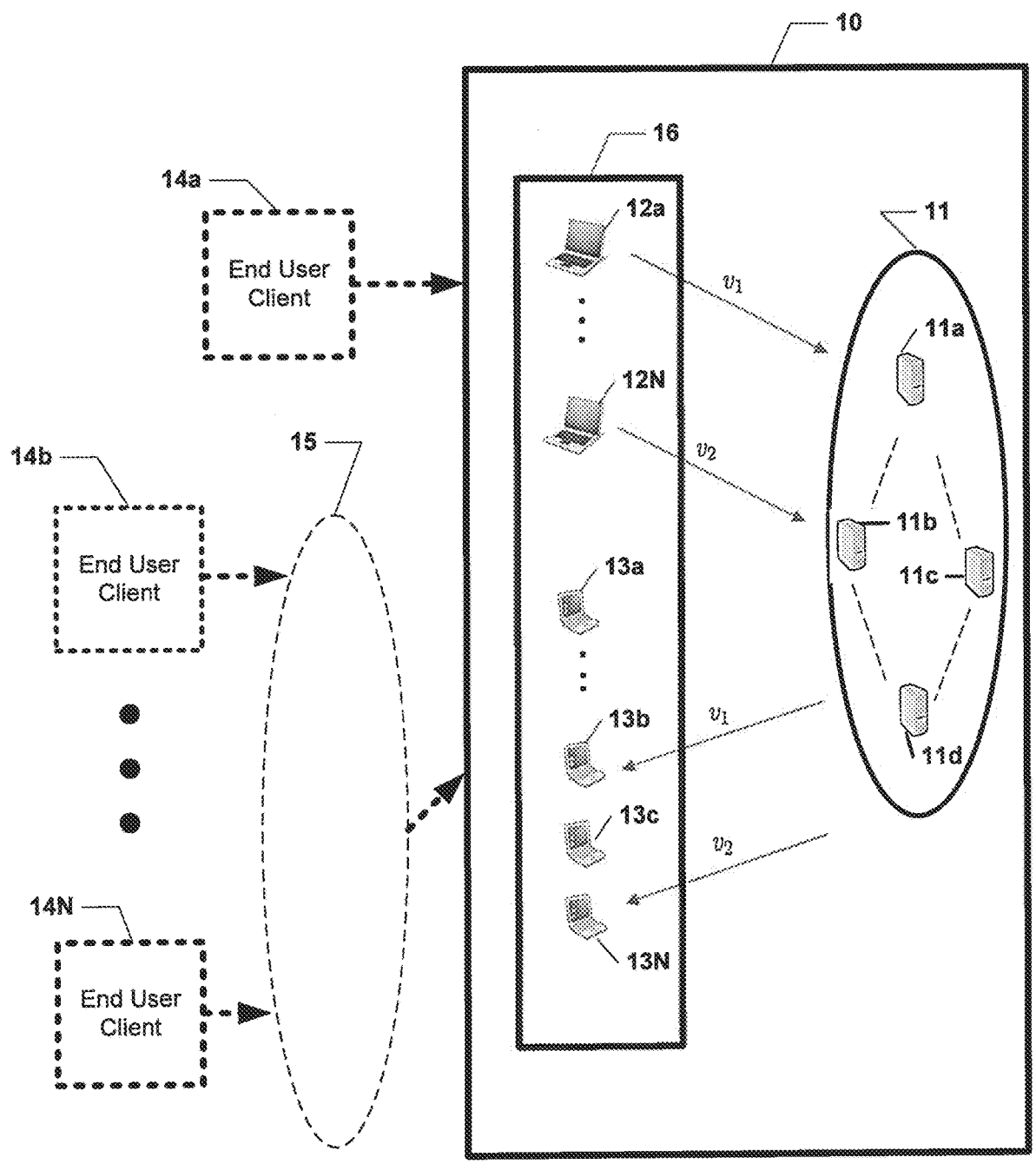
FIG. 1 is a block diagram of an illustrative distributed storage system (DSS) operating in accordance with a storage-optimized data-atomic (SODA) technique.

Before describing concepts, systems, devices and techniques which allow concurrent read and write operations by several reader and writer clients to one or more storage nodes while offering an atomic consistency guarantee and tolerating failures without violating the atomic consistency guarantee, some introductory concepts and terminology are explained.

As used herein, the term "storage device" (also sometimes referred to herein as a "storage") refers to any electronic machine or manufacture, such as a volatile or non-volatile memory, that stores digital data for later retrieval.

The term "storage node" (also sometimes referred to herein as a "storage server" or sometimes simply as "server") refers to any electronic machine or manufacture, such as a computer server, that provides, as an electronic service to another machine or manufacture, the capability to store or retrieve digital data in a storage device.

The term "data communication network" refers to any shared means of data communication by and between two or more computing devices (including storage nodes).

The term "data storage network" refers to two or more storage nodes that cooperate using a data communication network to store data in, and retrieve data from, one or more storage devices.

The term "writer" refers to a computerized process that writes data to a data storage network. The term "reader" refers to a computerized process that reads data from a data storage network. The term "data storage system" (also sometimes referred to herein as a "distributed storage system" or "DSS") refers to a data storage network having at least one reader and at least one writer.

The term "end user client" refers to a computerized process that communicates with a DSS to store and retrieve data therewith. The term "end user" refers to an individual or juristic entity that controls the operation of an end user client. Writers and readers are sometimes collectively referred to herein as "proxy clients" of the distributed storage system.

The term "version" refers to a particular syntactic value of semantically identified data. For example, a text file typically is semantically identified by a file name or an inode, and a version of that file is the text it contains at any given moment.

It should be appreciated that in some applications it is desirable to intentionally store one or more "copies" of the same data. This is accomplished by referring to each copy by a separate (semantic) name or number. For the purposes of the description herein below, such copies are not considered to be versions of the same data. It should thus be appreciated that it is possible to have multiple copies of the same data (with each copy considered to be a different file) and that each copy may have associated versions thereof at particular points in time.

The term "tag" refers to data that uniquely associates a version of a value v to be written with a requesting writer. For example, a tag may be a pair of totally orderable identifiers (z, w), where z identifies a version for the value v to be written, and w identifies a writer. The identifier z may be, for example, a sequence number or a time stamp. The identifier w may be, for example, a string of letters, an Internet Protocol (IP) address, or a number. Any two such tags may be compared in lexicographic (dictionary) order; that is, for any two tags $t_1$ and $t_2$, write $t_2 > t_1$ if either (i) $t_2 \cdot z > t_1 \cdot z$ or (ii) $t_2 \cdot z = t_1 \cdot z$ and $t_2 \cdot w > t_1 \cdot w$. Thus, use of the term "highest" with respect to a tag need not be a comparison of numerical values. A person of ordinary skill in the art may see how tags may be implemented in a manner not disclosed herein, but nevertheless may be compatible with disclosed embodiments.

Referring now to FIG. 1, a distributed storage system (DSS) 10 includes a plurality of storage nodes in communication with each other. In this illustrative embodiment, storage nodes 11a-11d are coupled using a data communication network to form a data storage network generally denoted 11. It should be appreciated that for simplicity and to promote clarity in the description of the broad concepts to be described herein, DSS 10 is here shown to include only four storage nodes. In practical systems, however, data storage network 11 may include a large number of storage nodes (e.g. hundreds or even thousands of nodes).

DSS 10 further includes a plurality of writers 12a-12N and a plurality of readers 13a-13N which communicate with the data storage network 11a-11d over a communication channel. The number of readers and writers may or may not be equal and in general they will differ.

A plurality of end user clients 14a-14N, generally denoted 14, communicate with DSS 10 via wired or wireless communication paths. It should be noted that some end user clients (e.g. end user client 14a) may be directly coupled to DSS 10 while other end user clients (e.g. end user clients 14b-14N) may be coupled to DSS 10 through a network 15. Network 15 may, for example, correspond to an intranet or an internet or to the Internet (i.e. the global system of interconnected computer networks that use the Internet protocol suite (TCP/IP) to link devices worldwide). It should be appreciated that end user clients 14 and network 15 are here shown in phantom since they are not properly a part of DSS 10.

End user clients 14 issue read and/or write instructions to the data storage network 11 via one or more of the readers 13 and/or writers 12, respectively (i.e. to either write data to or read data from storage) on behalf of end users (not shown). The readers 12 and writers 13 interface with both the end user clients 14 and data storage network 11 to read and write data to the storage nodes in response to requests from one or more of the end user clients 14. Thus, the readers 12 and writers 13 may sometimes be referred to herein as proxy clients 16 of data storage network 11, as they act as an interface or an intermediary for requests from end user clients 14 seeking read and/or write resources.

Writers, readers and storage nodes operate in accordance with the techniques to be describe herein below in conjunction with FIGS. 2-10 to ensure concurrent read and write operations by several reader and writer clients to one or more storage nodes while offering an atomic consistency guarantee and tolerating failures without violating the atomic consistency guarantee.

In some embodiments, DSS 10 is able to store massive datasets across several hundreds of storage nodes and is appropriate for use in both industrial and scientific applications. DSS 10 may physically reside, for example, in one or more datacenters. DSS 10 may also be deployed in commercial settings by industrial organizations such as Amazon, Google, Facebook, etc. to store user data and deploy applications including, but not limited to social networks, file sharing, and financial transactions.

In some embodiments, the components of DSS 10 may themselves be distributed across geographical regions and in communication via communication paths (which may include any type of wired or wireless communication path including optical paths).

It is assumed that every proxy client (i.e., writer and reader) is connected to every server through a reliable communication link. This means that as long as the destination process is non-faulty, any message sent on the link is guaranteed to eventually reach the destination process. The model allows the sender process to fail after placing the message in the channel; message-delivery depends only on whether the destination is non-faulty. Reliable connectivity between every pair of servers in the system also is assumed. No assumption is made regarding relative order of message delivery in the same channel.

Figure 2C:
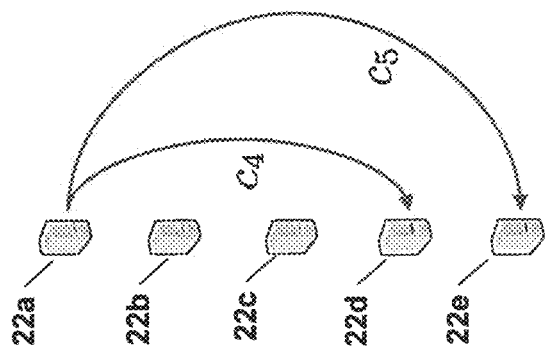
FIGS. 2A, 2B, and 2C are a sequence of views which illustrate a write operation in accordance with an embodiment.
Figure 2B:
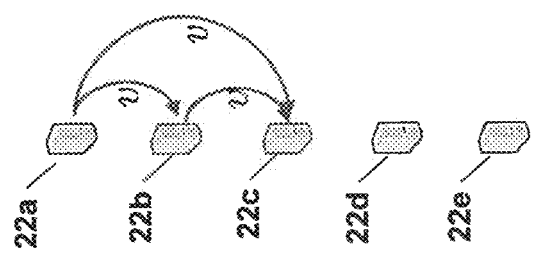
Figure 2A:
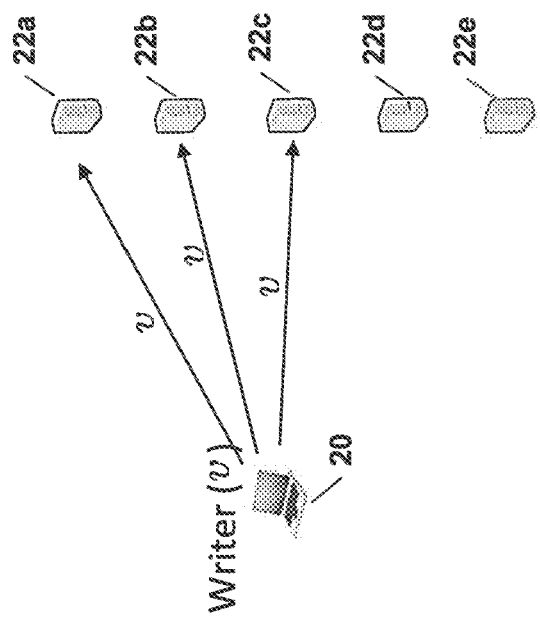

Techniques for imposing consistency during concurrent access of data by readers 13 and writers 12 are described herein below in conjunction with FIGS. 2-10. FIGS. 2A, 2B, and 2C are a sequence of views which illustrate a write operation in accordance with an embodiment; like elements are provided having like reference designations throughout the several views. Shown in these Figures are a writer 20 and five (5) storage nodes 22a-22e. The writer 20 may be a proxy writer, such as one of the writers 12a-12N in FIG. 1. Moreover, storage nodes 22a-22e may be the same as or similar to storage nodes 11a-11d in FIG. 1. Thus, writer 20 and storage nodes 22a-22e may form all or a portion of a DSS (which may be the same as or similar to DSS 10 described above in conjunction with FIG. 1). It should also be appreciated in this connection that, in other embodiments, the writer 20 may communicate with fewer or greater than five (5) nodes.

In describing a write operation, it is assumed that [n, k=n−f] MDS erasure codes are used, where n corresponds to the total number of storage nodes and f corresponds to the number of nodes allowed to fail while still ensuring completion of a write operation. In the particular example of FIGS. 2A-2C, five (5) storage nodes 22a-22e are shown (i.e. n=5), and the number of storage nodes allowed to fail is selected to be two (i.e. f=2).

It should be appreciated that a choice of f may depend on properties of the data storage system and the environment in which it is deployed. Typically, the choice of f is based on a balance between an application-specific need for crash fault tolerance and the financial cost of providing it. By way of illustration, in a typical datacenter about 5% of the servers are inoperative or faulty at any given moment. In such an environment, f may not be large, for example about 10% of the number n of total storage nodes (i.e., twice the average number of failed servers). In any event, as is known in the art, the number f is constrained to be less than 50% of the number n of total storage nodes to permit recovery of a stored value using an [n, n−f] erasure code.

It also should be appreciated, as will become apparent from the description herein below, that only one coded element is stored in a node at any one time. It also should be appreciated that one challenge in the write operation is to send the coded elements to all nodes, despite a writer crash (i.e. to complete a write operation despite a writer crash).

Returning to FIG. 2A, the writer 20 receives a request to write a value v to the storage nodes 22a-22e. Such a write request may originate from an end user client, such as one of end user clients 14 in FIG. 1, which sends or otherwise communicates data (e.g. a file or other value) to be stored to a DSS. The writer 20 responds as described below in more detail in connection with FIGS. 4 and 9; in summary, the writer 20 computes a unique tag t identifying the writer and the version of the value v, then sends the information (t, v) to each of the first f+1 nodes (i.e. to nodes 22a-22c) as shown.

To ensure crash fault-tolerance, upon receiving the tagged value (t, v), each node (logically numbered i) of the first f+1 nodes forwards the information (t, v) to nodes i+1 through f+1 inclusive, as shown in FIG. 2B for the case i=1 (i.e., for node 22a). Thus, as illustrated in FIG. 2B, node 22a forwards the value v to nodes 22b, 22c. Similarly, when the value v is received at node 22b, node 22b forwards the value v to node 22c. This process may be easily generalized to any numbers of nodes n and permissible faults f, and is shown in more detail in FIG. 9.

Finally, as illustrated in FIG. 2C, each node i (where $1 \leq i \leq f+1$) computes and sends coded elements c to the remaining nodes j (where $f+1<j \leq n$), and also stores its own coded element. In an embodiment, network coding, and in particular random linear network coding, may be used to form the coded elements. Thus, in the example of FIG. 2C, node 22a computes a coded element $c_1$ (and associated tag) for itself and also sends coded elements $c_4$-$c_5$ (and associated tags) to respective ones of nodes 22d-22e.

In other words, each of non-faulty nodes among the first f+1 nodes (here 22a-22c) receives a value, computes and receives a coded element for itself, and computes and sends a coded element to each of the remaining n−f−1 nodes (here 22d-22e). With this approach, even in the event of a writer crash, if even one of the first f+1 nodes receives a value v to write collectively using the storage nodes 22a-22e, coded elements are sent to all storage nodes 22a-22e, and received by all such storage nodes that are non-faulty. Moreover, because coding each element is a function of the number of the node by which it is to be stored, each of the nodes j receives the same coded element f+1 times—once for each of the first f+1 storage nodes. Further details of the write operation are described below in conjunction with FIGS. 4-5, 8-9, and 11.

Figure 3B:
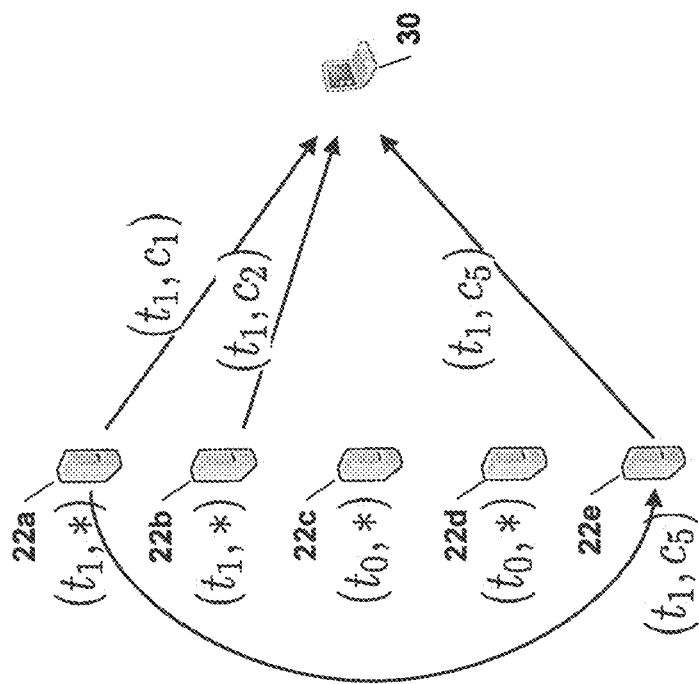
FIGS. 3A and 3B are a sequence of views which illustrate a read operation in accordance with the embodiment of FIG. 2A-2C.
Figure 3A:
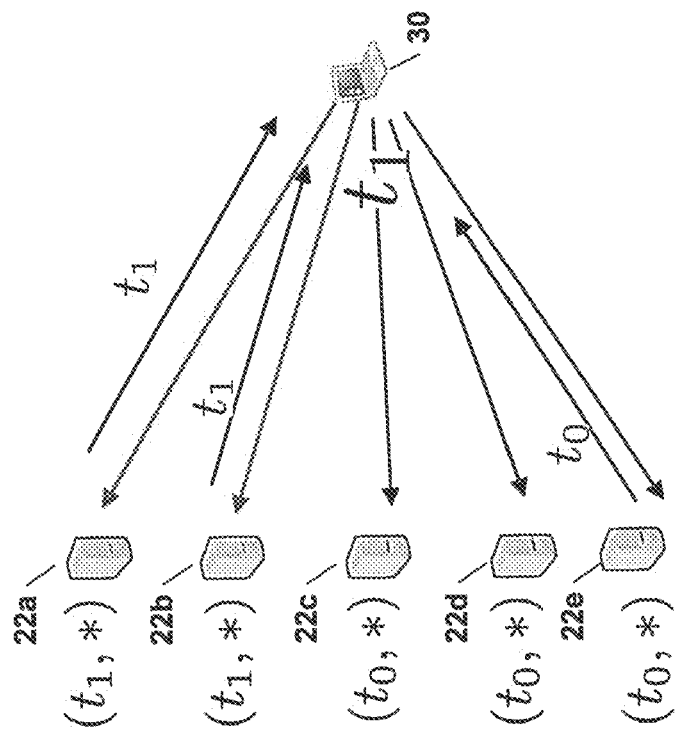

Referring now to FIGS. 3A and 3B, there is shown a corresponding sequence of views which illustrate a read operation in accordance with an embodiment; like elements are provided having like reference designations throughout the several views. Shown in these Figures are the storage nodes 22a-22e of FIG. 2. Also shown is a reader 30, which may be the same as or similar to one of the readers 13a-13N of FIG. 1. The storage nodes are shown with their stored tags and an asterisk that represents a corresponding coded element.

The reader 30 receives a request to read a value v stored in the storage nodes 22a-22e. Such a read request may originate from an end user client, such as one of end user clients 14 in FIG. 1, which requests or otherwise communicates that data (e.g. a file or other value) should be read from a DSS. The reader 30 responds as described below in more detail in connection with FIGS. 6-8 and 10; in summary, the reader 30 determines the highest-ordered tag t for the value v as currently stored from a majority of the storage nodes, then requests the version of v associated with that tag (i.e., the version t·z), as shown in FIG. 3A.

Then, in FIG. 3B, the reader 30 receives sufficient coded values having that version to reconstruct the value v by decoding the MDS encoding. The example of FIGS. 3A and 3B uses a [5,3] code, so the received coded elements $c_1$, $c_2$, and $c_5$ (all having version $t_1$) are enough to recover the value v. Note that the arrow in FIG. 3B from storage node 22a to storage node 22e indicates that the former node updated the latter node with a newer coded element (i.e., the coded element $c_5$) after the processes of FIG. 3A but before (or during) the processes of FIG. 3B. This arrow corresponds to a coded element update provided by a concurrent write, as illustrated in FIG. 2C and described above in connection therewith.

The SODA algorithm is illustrated in connection with the flow diagrams of FIGS. 4-10, which show illustrative processing that can be implemented within a proxy client and/or storage system (e.g., within a system such as that shown and described above in conjunction with FIG. 1). The algorithm employs majority quorum, and uses erasure codes to reduce storage cost. Tags are used for version control of the object values.

Each server stores three state variables. The first state variable is $(t, c_s)$, a tag and coded element pair which is initially set to $(t_0, c_0)$. The second state variable is denoted $R_c$, an initially empty set of pairs of the form $(r, t_r)$, each pair indicating that the reader r is being currently served by this server with respect to a tag $t_r$. The third state variable is H, an initially empty set of tuples $(t, s', r)$, each tuple indicating that the server s' has sent a coded element corresponding to the tag t, to reader r.

Two types of messages are sent: messages that carry metadata, and messages that comprise in part or full an object value. The messages sent from the proxy clients are labeled with phase names, such as READ-GET, READ-VALUE, READ-COMPLETE and WRITE-GET. The server-to-server messages are labeled as READ-DISPERSE. Also, in some phases of SODA, the message-disperse primitives MD-META and MD-VALUE are used as services.

Bracketed rectangular elements (typified by elements 41 and 43 in FIG. 4), herein denoted "subprocessing blocks," represent processes illustrated more fully in other figures; rectangular elements (typified by element 42 in FIG. 4), herein denoted "processing blocks," represent self-contained processes; and diamond shaped elements (typified by element 44 in FIG. 4), herein denoted "decision blocks," represent processes which affect the flow of the flow diagrams.

The processing and subprocessing blocks may represent steps performed by functionally equivalent circuits such as a digital signal processor (DSP) circuit, an application specific integrated circuit (ASIC) a field programmable gate array (FPGA), a central processing unit (CPU) or any type of processor or processing element. The flow diagrams do not depict the syntax of any particular programming language, but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In FIGS. 4-10, communication between computing devices, such as readers, writers, servers, and data storage devices (i.e. memories), is represented by dashed lines, and may be performed by any communication techniques known in the art.

Figure 4:
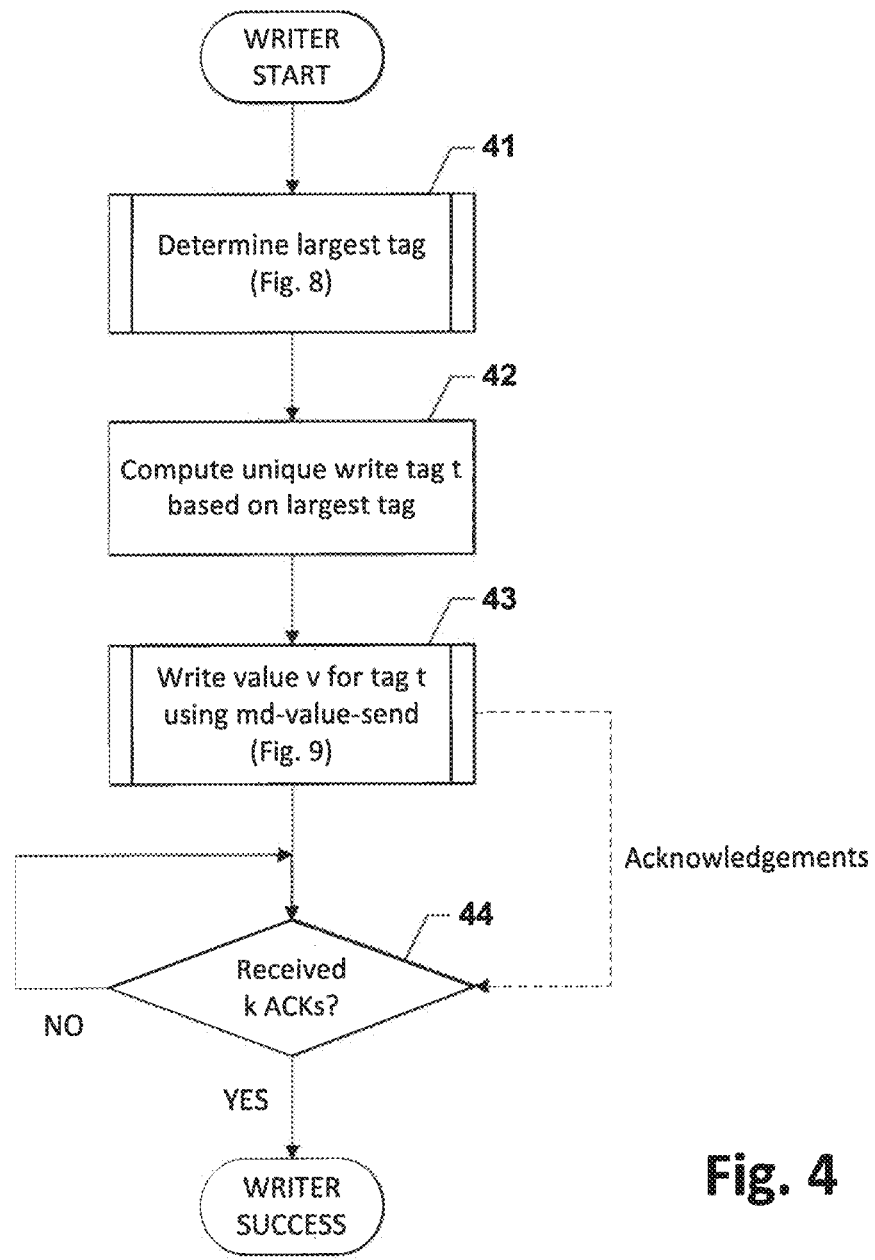
FIG. 4 is a flow diagram of a writer portion of an illustrative write operation.
Figure 5:
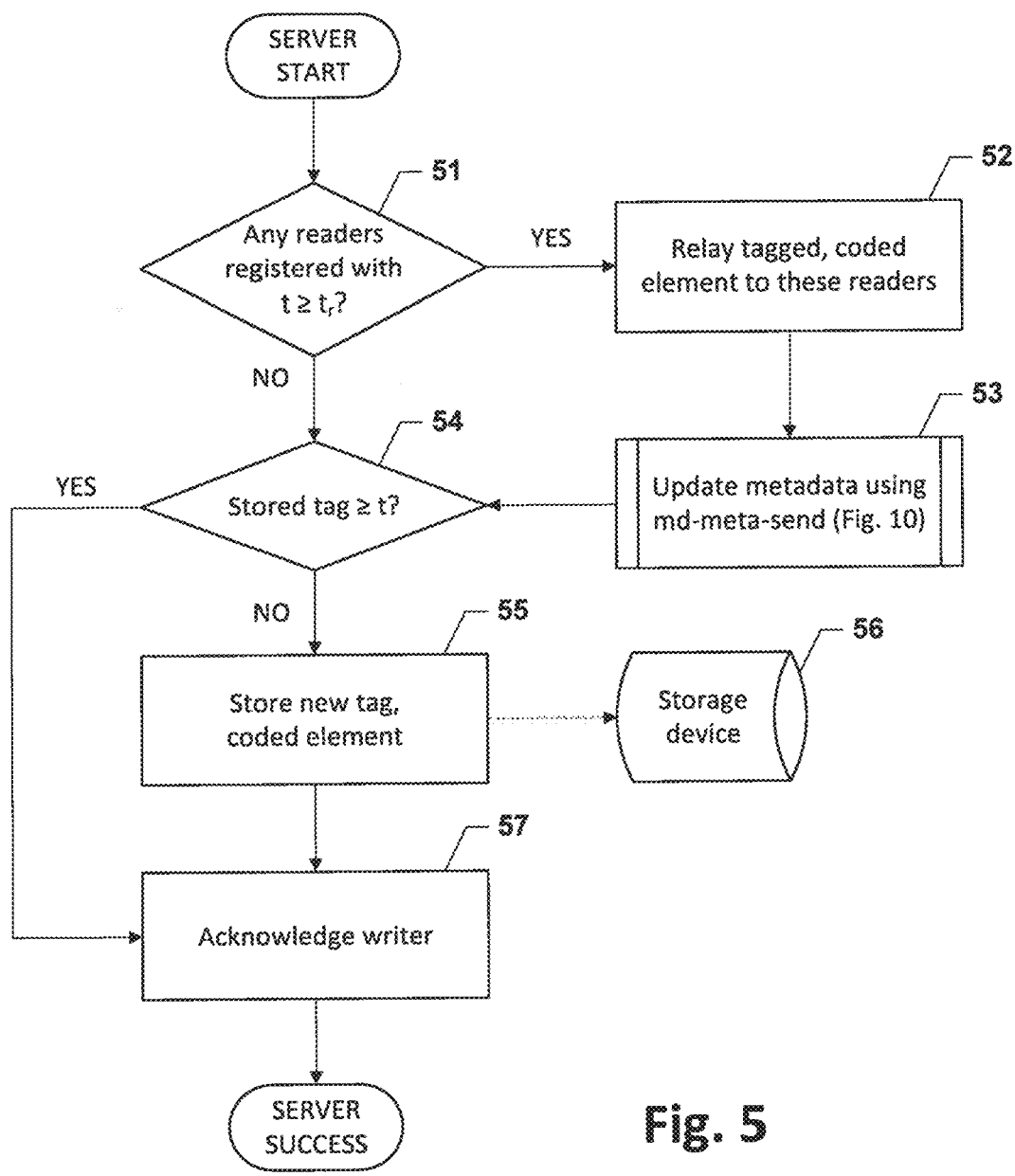
FIG. 5 is a flow diagram of a server portion of the illustrative write operation of FIG. 4.

FIG. 4 illustrates processes enabling a writer w (e.g. one of writers 12 in FIG. 1 or writer 20 in FIG. 2) to write a value v; the corresponding server processing is shown in FIG. 5. The goal is to store one coded element per server. To optimize storage cost, at any point of the execution, each server only stores the coded element corresponding to one particular tag.

The write operation consists of two phases. In the first phase, the writer queries all servers for the local tags that are stored, awaits response from a majority and then picks the highest-ordered tag $t_{max}$. The writer w creates a new tag given by $t_w = (t_{max} \cdot z + 1, w)$. In the second phase, the writer sends the message $(t_w, v)$ to all servers in S, via md-meta-send$(t_w, v)$, and this ensures that every server that is non-faulty will eventually receive the message $(t_w, c_s)$, where $c_s$ denotes the coded element corresponding to server s. If the server s finds that $t_w > t$, then the local tag and coded element are replaced by $(t_w, c_s)$. In any case, the server sends an acknowledgment back to the writer w. A few additional steps are performed by the server while responding to the message $(t_w, c_s)$; these are explained below in connection the read operation of FIGS. 6-7. Finally, the writer terminates after receiving acknowledgment from at least k servers.

Figure 8:
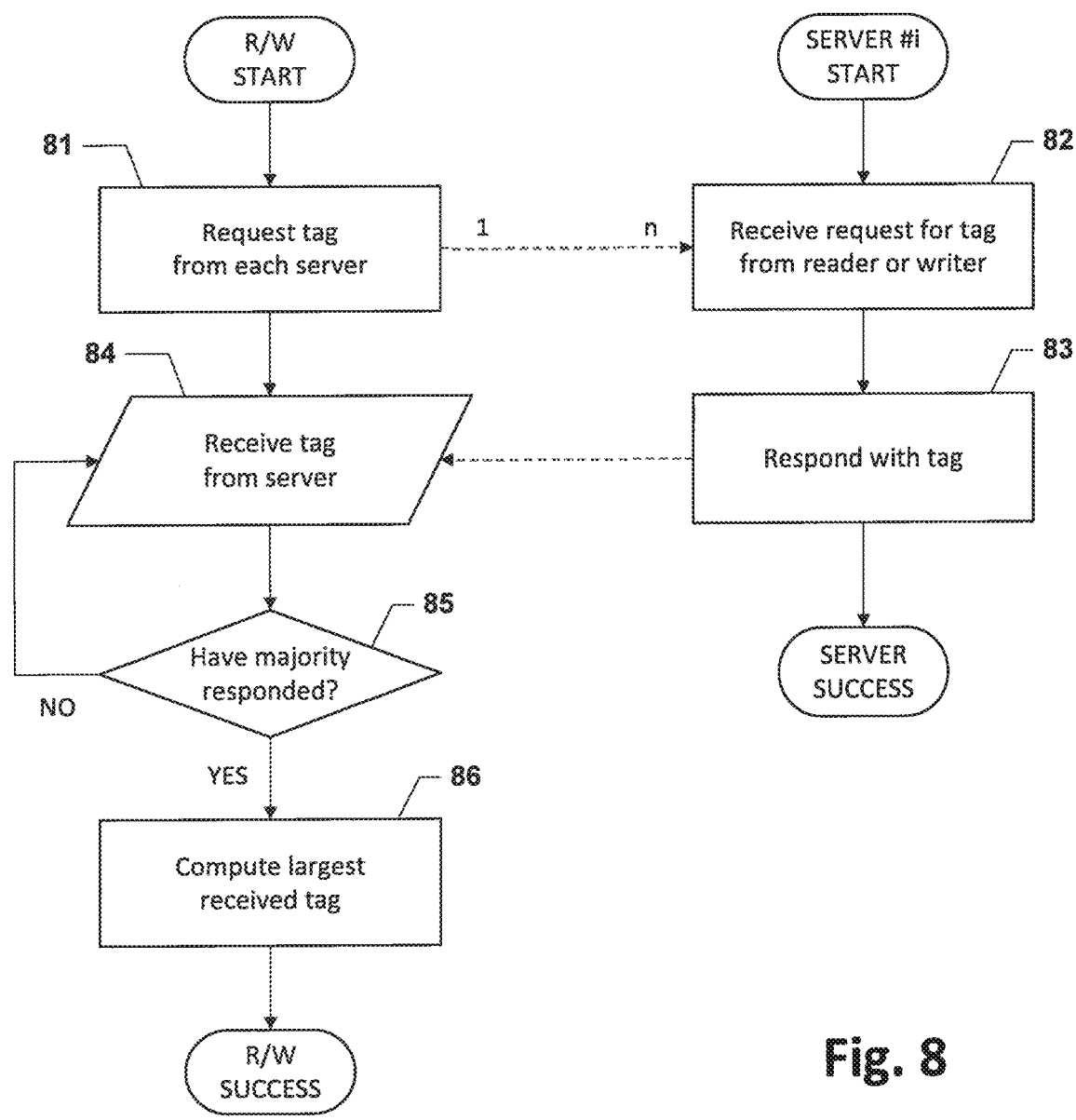
FIG. 8 is a flow diagram of a tag retrieval portion of an illustrative write-get or read-get operation in accordance with the embodiments of FIGS. 4-7.

In relation to the processes illustrated in FIG. 2A, a first subprocess block 41 performs the processes of FIG. 8. These processes determine the highest-ordered tag stored by the plurality of servers in association with the value v to be written. Next, a process 42 computes a unique write tag t based on the highest-ordered tag stored by the plurality of servers. Since tags may be compared in lexicographic order, if $t_{max}$ is the highest-ordered tag stored by the plurality of servers in association with the value v to be written, then the new tag $t = (t_{max} \cdot z + 1, w)$ is guaranteed to be higher-ordered than $t_{max}$ (for example), and thus to represent data having a version number higher-ordered than any currently associated with the value v. Thus, the process 42 may output a write tag corresponding to this formula.

It should be appreciated that, if two or more writers attempt to update the value v concurrently, there exists a race condition in which they both obtain the same value of $t_{max}$. According to lexicographic ordering, the highest-ordered writer will have the highest-ordered tag, and as described below may ultimately obtain precedence for storing its value v over the value of a lower-ordered writer. If it is desired for the lower-ordered writer to obtain precedence, the process 42 may use an alternate computation to produce an alternate write tag given by the formula $t=(t_{max} \cdot z+2, w)$. Such a write tag will obtain storage precedence over other simultaneous writers that produce tags in accordance with the formula in the previous paragraph (i.e., whose storage precedence is "+1" rather than "+2"). This line of reasoning easily may be generalized to permit writers to store data values according to an arbitrary precedence value.

Figure 9:
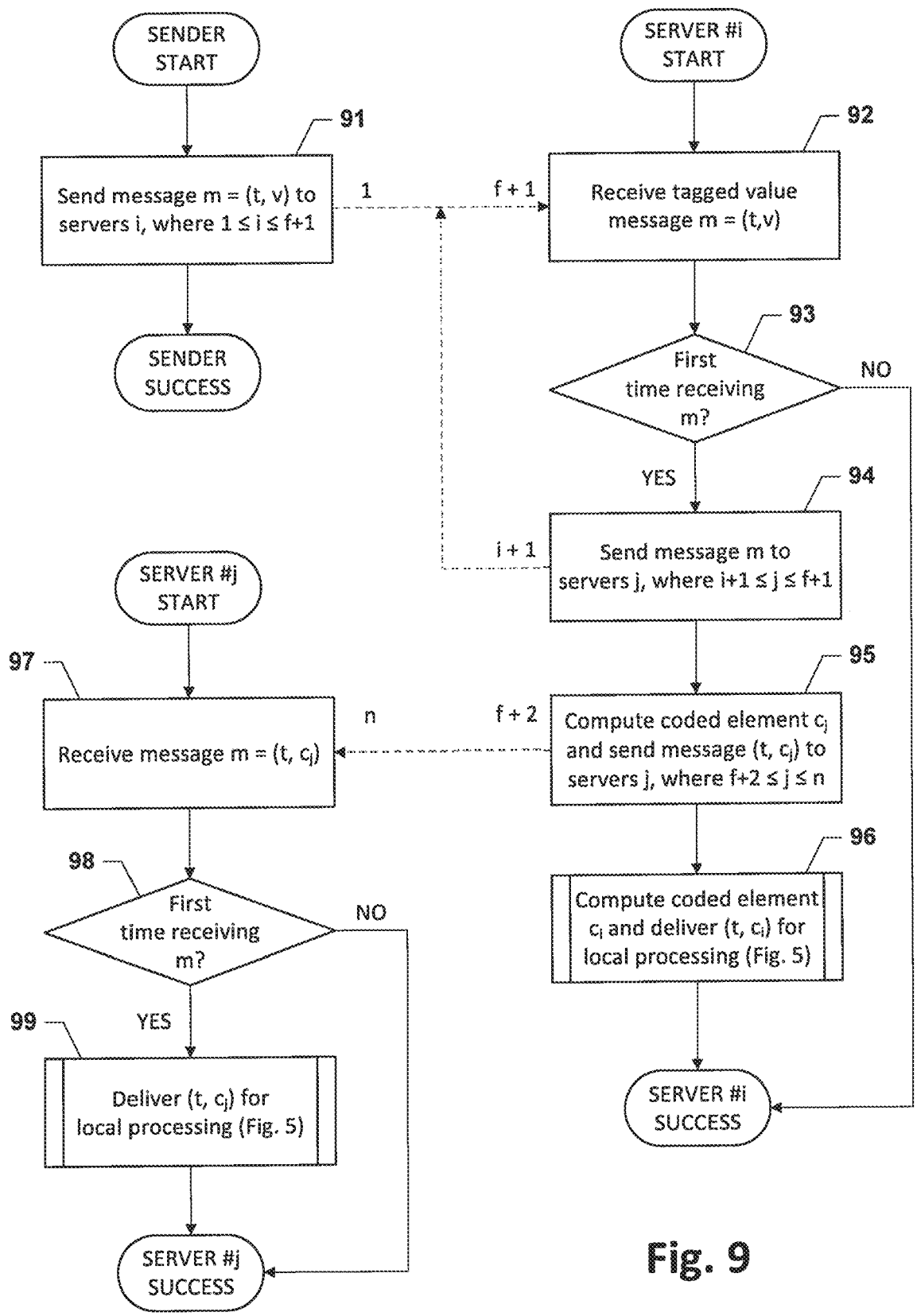
FIG. 9 is a flow diagram of an illustrative, crash fault-tolerant, value-disperse operation.

Also in relation to FIG. 2A, the subprocess block 43 performs the processes of FIG. 9. These processes use the "md-value-send" primitive to initiate storage of the value v using the write tag t computed in the process 42, which results in the processes shown in FIGS. 2B and 2C. These processes ensure delivery, to each storage server in the DSS, of a coded element specifically computed for storage there.

As shown in FIG. 5 and described below, each non-failed server acknowledges, to the writer, delivery of the coded element. Acknowledgements are collected in a process 44, whose successful completion indicates that enough such coded elements have been stored in non-failed servers to reconstruct the value encoded by an [n,k] erasure code. Thus, once k acknowledgements have been received, the writer process may take as given that the value has been safely stored in the servers, and terminate successfully as indicated. Alternately, as may be understood by persons skilled in the art, if k such acknowledgements are not received within a given duration, then a processing error has somehow occurred, and the method may terminate abnormally.

FIG. 5 is a flow diagram showing processes, in accordance with the embodiment of FIG. 4, for a storage node i to locally process a message containing a tagged, coded element $(t, c_i)$. It should be appreciated that one problem in distributed storage systems occurs when a reader requests a value stored in the DSS, but a concurrent write changes the value before the reader can decode it from its stored, coded elements. Disclosed embodiments solve this problem by using a registry, whereby each reader registers with the DSS to receive not just the current version of a value v, but also newer versions as concurrent writes occur. Each reader then may temporarily store coded elements associated with different versions, and a value can be decoded when enough such coded elements have been received for a single version (i.e., k elements for an [n, k] encoding).

Thus, in a first process 51, the storage node i determines whether any readers have registered to obtain versions of the value v being concurrently written; that is, whether $t \geq t_r$, where $t_r \cdot z$ is the older version number. If such a condition holds, then the just-received message (t, c') is relayed to each such registered reader in a process 52. To ensure that state variables are eventually cleaned up in case the reader itself fails, in a subprocess block 53 the other storage nodes are sent a metadata update using the md-meta-send processes illustrated in FIG. 10 and described below. In particular, once the storage node i receives indications in this manner that k−1 other storage nodes have relayed their own coded elements to a given registered reader, the storage node i may take as given that the registered reader has enough information to decode the value v, and may clean up its state.

Figure 12:
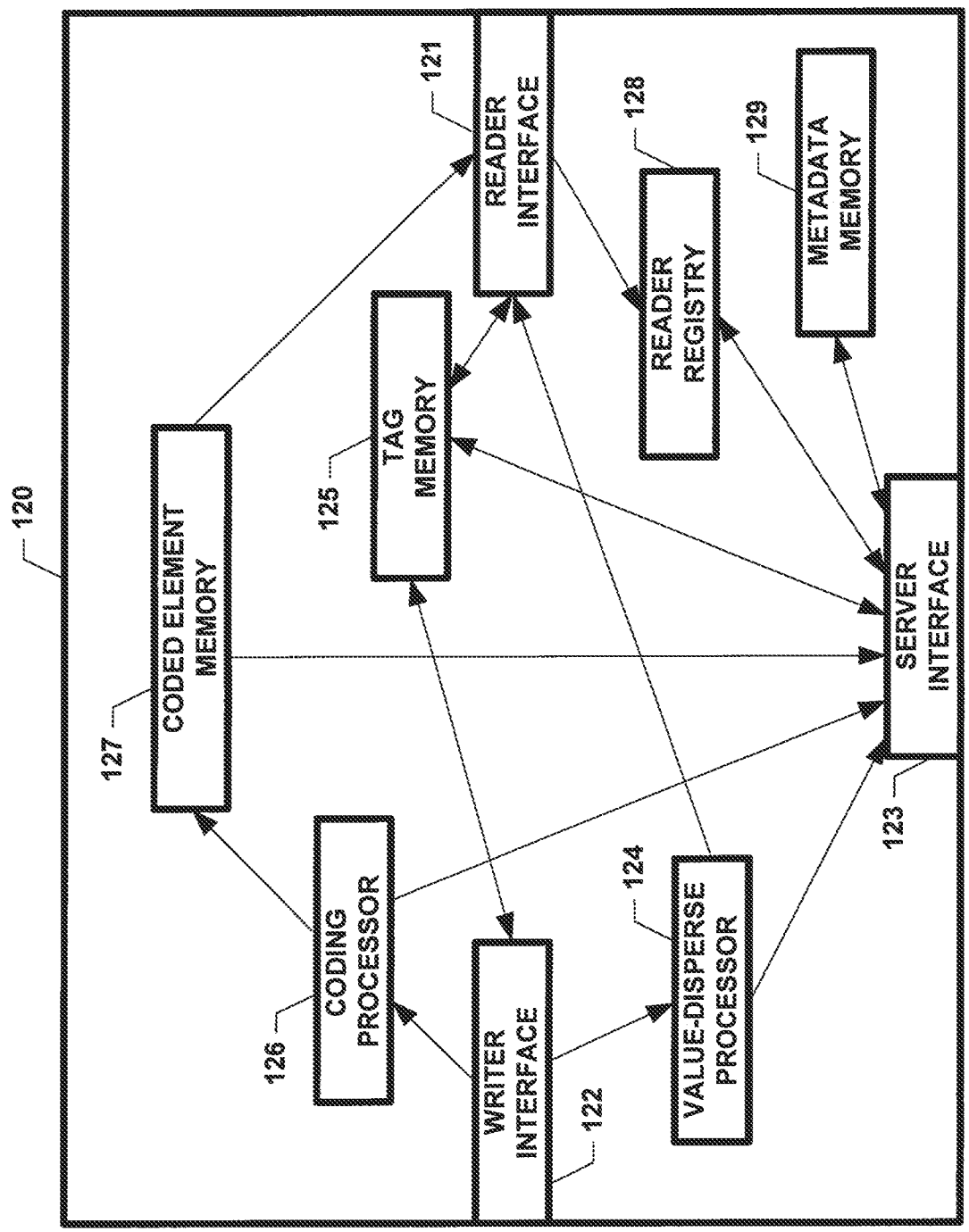
FIG. 12 is a block diagram of an illustrative storage node server of the type which may be used in a DSS which may be the same as or similar to the DSS of FIG. 1.

Once any registered readers have been notified, the storage node i determines whether its own information is more recent than the new information in process 54. That is, the tag stored for the value v is compared to the tag for the value v just received from the writer. The tag comparisons of process 51 and process 54 may be accomplished, for example, by consulting a local tag memory, as illustrated in FIG. 12 and described below in detail.

If the stored tag is more recent than the new tag, then the method continues to process 57, in which the writer is acknowledged (as shown by the dashed line in FIG. 4 and mentioned above in connection therewith), to permit the processes of FIGS. 4 and 5 to terminate at the earliest possible moment. However, if the stored tag is not more recent than the new tag, then the coded value must be updated. Thus, a process 55 stores the new tag and coded element in a storage device 56 before proceeding to acknowledge the writer.

The SODA read operation is now described in connection with FIGS. 6-7. Like a writer, a reader r during the first phase polls all the servers for the locally stored tags, awaits response from a majority and then picks the highest-ordered tag, which is called $t_r$. In the second phase, the reader sends the message $m=(r,t_r)$ to all servers in S, via md-meta-send (READ-GET, $(r,t_r)$). The algorithm is designed so that r decodes a value corresponding to some tag $t \geq t_r$.

Any server that receives m registers the $(r,t_r)$ pair locally. Here, the term "register" means adding the pair $(r,t_r)$ to $R_c$ by executing the step $R_c \leftarrow R_c \cup \{(r,t_r)\}$ during the read-value phase at the server. Similarly, by "unregister" is meant the opposite, i.e., remove the pair from $R_c$. The server sends the locally available $(t,c_s)$ pair to the reader if $t \geq t_r$. Furthermore, every time a new message $(t_w,c_s)$ is received at the server, due to some concurrent write with $(t_w,v)$, the server sends the message $(t_w,c_s)$ to r if $t_w \geq t_r$. Note that there can be situations where the server does not store $c_s$ locally, for instance, if the local tag t is higher-ordered than the writer's tag $t_w$, but simply sends the coded element $c_s$ to r. The reader keeps accumulating $(t,c_s)$ pairs it receives from various servers, until the reader has k coded elements corresponding to some tag $t_{read}$. At this point the reader decodes the value $(t_{read}, v)$. Before returning the value v, the reader sends a READ-COMPLETE message so that the reader can be unregistered by the active servers, i.e., $(r,t_r)$ is removed from their local variable $R_c$.

The algorithm ensures that a failed reader is not sent messages indefinitely by any server. Assume that the pair $(r,t_r)$ is registered at server s, to continue sending coded elements from new writes for tags higher-ordered than or equal to $t_r$. Once k distinct coded elements for such a tag is known to have been sent, reader r will be unregistered, and server s no longer sends messages for that read. In order to implement this, any server s' that sends a coded element corresponding to tag t' to reader r also sends (s',t',r) to all the other servers, by calling md-meta-send(READ-DISPERSE,(s',t', r)), described below in connection with FIG. 10. The server s which receives the (s',t',r) tuple adds it to a local history variable H, and is able to keep track of the number of coded elements sent to the registered reader r. So, servers eventually unregisters reader r and also cleans up history variable H by removing the tuples corresponding to r.

Server s accumulates any received (s',t',r') tuple in its history variable H, even if reader r' has not yet been registered by it. The use of the message-disperse primitive by r', by calling md-meta-send (READ-VALUE $(r',t_{r'})$), described below in connection with FIG. 10, to register the pair $(r',t_{r'})$ ensures that s will also eventually register r'. Once r' gets registered at s, these entries will be used by s to figure out if r' can be unregistered.

Since no order in message arrivals is assumed, a READ-COMPLETE message may arrive at server s from reader r even before the server s receives the request for registration from r. In this case, during the response to READ-COMPLETE phase, the server adds the tuple $(t_0,s,r)$ to the set variable H, where $t_0$ is a dummy tag. If the server is non-faulty, the registration request from the reader must arrive at s at some future point in time. The reader r is registered by server s in response to read-value phase only if the tuple $(t_0,s,r)$ is not in H.

During each read operation the reader appends a unique identifier (e.g., a counter or a time stamp) in addition to its own id r. Though it can be proved that every server will eventually stop sending coded elements to any reader r, it can happen that the entries in H corresponding to rare not entirely cleared. The usage of unique identifiers for distinct read operations from the same reader ensures that the stale entries in H do not affect new reads.

Figure 6:
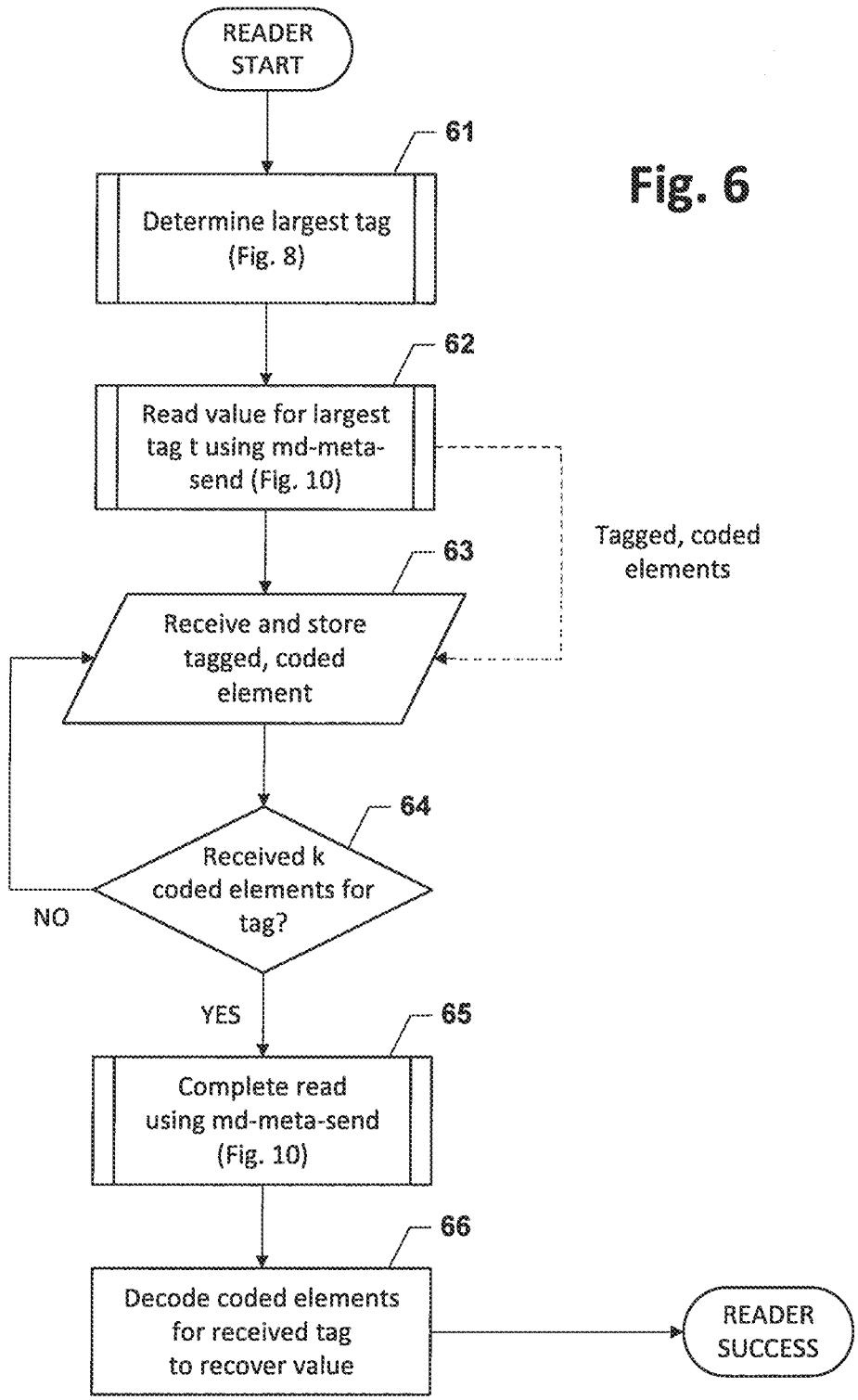
FIG. 6 is a flow diagram of a reader portion of an illustrative read operation.

Turning now to FIG. 6, it is assumed that a reader (e.g. one of readers 13 in FIG. 1 or reader 30 in FIG. 3) wishes to read a value v stored in a distributed storage system, as illustrated in FIG. 3 and summarized above. In connection with the processes illustrated in FIG. 3A and described above, a first subprocess block 61 performs the processes of FIG. 8. These processes determine the highest-ordered tag t stored by the plurality of servers in association with the value v to be read. Next, a subprocess block 62 requests to read the value for the version of the tag t, using the "md-meta-send" processes of FIG. 10.

Figure 10:
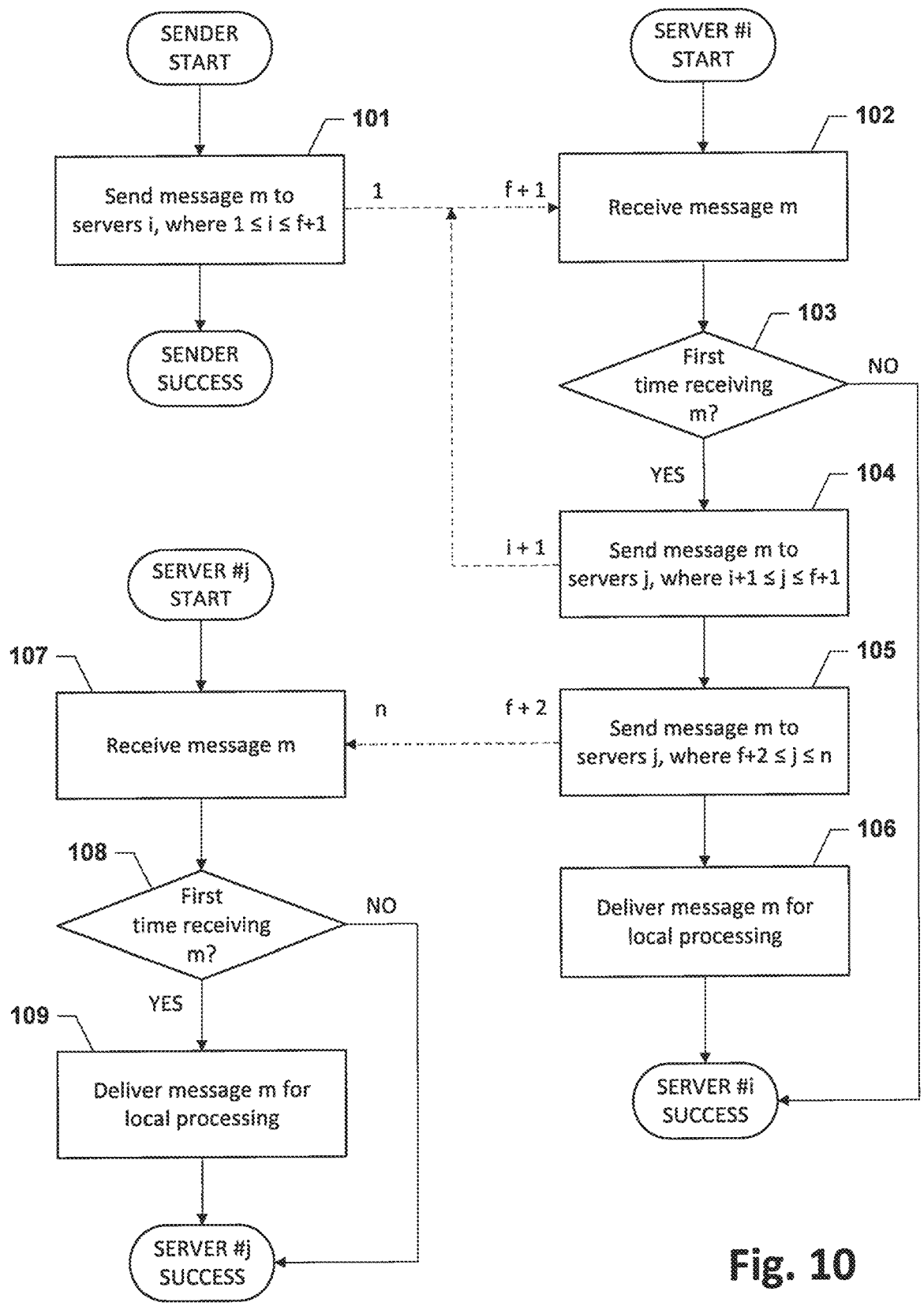
FIG. 10 is a flow diagram of an illustrative, crash fault-tolerant, message-disperse (MD) operation that generalizes the flow diagram of FIG. 9.

The processes of FIG. 10 ensure that each storage server sends any coded elements it has stored or that it receives, for which the associated tag is at least as recent as the tag t. In relation to FIG. 3B, the reader receives and stores these tagged, coded elements in a process 63. As explained above, when enough coded elements are received for a given tag (which must be at least as highly-ordered as t), the value encoded by those coded elements may be recovered. In connection with disclosed embodiments, k coded elements are enough to decode an [n, k] MDS encoding.

Thus, in a process 64, the reader determines whether it has received k coded elements for the tag most recently received. If not, then it must await the arrival of further tagged, coded elements, and returns to the process 63. However, if it has received k coded elements, it has enough information to decode the value v. To permit state variables and their associated resources to be released at the earliest possible moment, in process 65 the reader completes the read by using "md-meta-send" to inform the DSS that the read is complete. This mechanism cooperates with the "md-meta-send" process 53 of FIG. 5 to ensure that all state is eventually cleared. Finally, in process 66 the reader decodes the coded elements for the most recently received tag, to thereby recover the value v.

Figure 7:
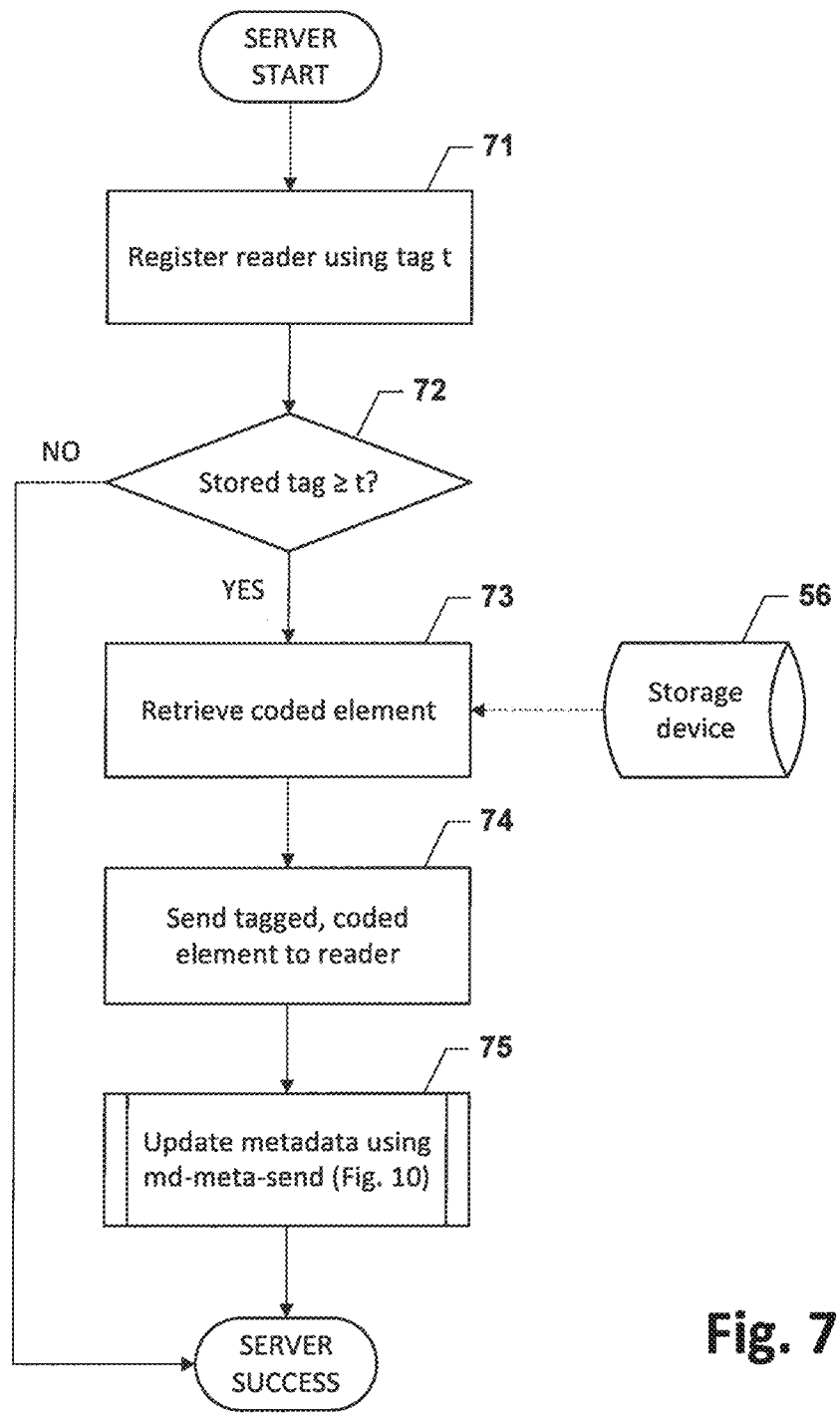
FIG. 7 is a flow diagram of a server portion of the illustrative server read operation of FIG. 6.

FIG. 7 is a flow diagram showing processes, in accordance with the embodiment of FIG. 6, for a storage node to locally process a request to read a value associated with a tag t. To implement the registry system described above in connection with FIG. 5, a first process 71 registers the tag t in the registry of the storage node. The server will begin to relay updated coded elements to the registered reader as soon as this process 71 completes (see FIG. 5, processes 51-53), and continue forwarding until the reader is unregistered (e.g. by the server after the reader performs process 65).

In process 72, the storage node determines whether its stored value is at least as recent as (if not newer than) the requested version in the received tag t. If not, no further action needs to be taken. However, if the stored value is at least as recent as the requested version, then its coded element is sent to the reader.

Thus, in process 73 the storage node retrieves the coded element from the storage device 56. Then, in process 74 the storage node tags the coded element with its own highest version, and sends the tagged, coded element to the requesting reader. Finally, in process 75 the storage node informs the other storage nodes that it has relayed a tagged, coded element to the reader. The process 75 permits the other storage nodes to clean up their state variables absent reception of a "read-complete" metadata message from the reader in process 65 of FIG. 6, in a manner analogous to process 53 of FIG. 5.

FIG. 8 is a flow diagram showing processes, in accordance with the embodiments of FIGS. 4 and 6, for determining a highest-ordered tag for a value stored in a distributed storage system. In accordance with the discussion above, each write or read of data in a DSS first requires that the writer or reader determine in process 41 or process 61, respectively, the highest-ordered tag for a value v stored in the DSS. A writer uses this tag to create a new tag with a higher-ordered version identifier so that it may write a new version of the value v, while a reader uses this tag to request the value having the latest version.

In a first process 81, a writer (such as a writer 12 of FIG. 1) or a reader (such as a reader 13 of FIG. 1) requests the highest-ordered (i.e., most recent) tag from each of the n storage nodes in a data storage network. As indicated by the dashed line, this request involves one (1) writer or reader, as the case may be, sending a message to each one of the n storage nodes in the data storage network. In process 82, each storage node i receives the request for its value tag, and in process 83, the storage node i responds to the writer or reader with the tag associated with the value.

The writer or reader continues in process 84, in which it receives the tag $t_i$ from storage node i. However, as concurrent writes of the value v may be ongoing, the tag $t_i$ need not reflect the most recent write operation. To guard against this condition, the writer or reader waits to hear from a sufficient number of the storage nodes in the data storage network, as indicated by decision block 85.

Thus, processing block 84 and decision block 85 implement a loop in which the writer or reader awaits a response from a number of storage nodes sufficient to determine which tag to use in further processing. In one embodiment, a sufficient number of storage nodes corresponds to a majority of the storage nodes. Thus, in the case where there are 100 storage nodes, a sufficient number would be 51 storage nodes. In another embodiment, a sufficient number of storage nodes corresponds to the number k of coded values required to recover a value stored according to an [n, k] MDS encoding, which may be much more than the majority. Thus, in the case where up to 10 storage nodes are allowed to fail and k is chosen to be 100−10=90, a sufficient number would be 90 storage nodes. Once the writer or reader has received tags from a sufficient number of storage nodes, the writer or reader selects the tag which indicates the most recent version of the value (e.g. a highest-ordered tag denoted $t_{max}$).

Next is explained a modification of the SODA algorithm that handles the case where some of the non-faulty servers can return erroneous coded elements during a read operation. Here the parameter k is chosen as k=n−f−2e. The encoding and distribution of n coded elements among the n servers remain same as above. While decoding, any f missing coded elements, as well as e erroneous coded-elements among the remaining elements, must be tolerated.

For example, assume that coded elements $c_1, \ldots, c_{n-f}$ are available to the decoder—the servers which store the remaining coded elements might have crashed, where e out of these n−f elements are erroneous, and the decoder does not know the error locations. It is well known that [n,k] MDS codes can tolerate any pattern of f erasures and e errors if k=n−f−2e. Use $\phi_{err}^{-1}$ to denote the decoder used to recover the value v; in this example, $v=\phi_{err}^{-1}(\{c_1, \ldots, c_{n-f}\})$. Once again, it is assumed that the decoder is aware of the index set I corresponding to the n−f=k+2e coded elements that are being used in the decoder.

Two modifications needed to SODA to implement these features. First, during the read-value phase initiated by the reader, any reader must wait until it accumulates k+2e coded elements corresponding to a tag before it can decode. Recall that the SODA algorithm only requires k coded elements before the reader can decode. Also note that the decoder $\phi_{err}^{-1}$ for the modified algorithm is different from that used for SODA, since it must accept k+2e coded elements, of which e elements are possibly erroneous. Second, when a server receives a READ-DISPERSE,(t,s',r) message, it determines whether the number of coded elements sent (from various servers) to reader r corresponding to tag t is at least k+2e, before deciding to unregister the reader r.

Now the message-disperse (MD) services that are used to disseminate messages in SODA are described in connection with FIGS. 9 and 10. They have the property that if a message m is delivered to any server in S, then the same message (or a derived message) is eventually delivered at every non-faulty server in S. The services are implemented on top of point-to-point reliable channels.

The services are provided in terms of the MD-VALUE primitive, used for delivering the coded elements for the values (FIG. 9), and the MD-META primitive, used for the metadata delivery (FIG. 10). As described above, these primitives are invoked by the send-event md-value-send (or md-meta-send) at some process p, and result in delivery-event md-value-deliver (or md-meta-deliver) at any non-faulty process s∈S. Due to space constraints, only the MD-VALUE primitive is discussed in detail. The MD-META primitive differs from the MD-VALUE primitive only in a minor way, and the differences alone are discussed.

Data Types and State Variables: In an IO Automata specification of MD-VALUE, for any value v∈V the coded element corresponding to s∈S is denoted as $c_s \equiv \phi_s(v)$. $M_{ID} \equiv S \times N$ is the set of unique message identifiers. Each message is one of two types: TYPES={"full", "coded"}. In MD-VALUE-SENDER$_p$ boolean state variables failed and active are initially false. The state variable, mCount, keeps track of the number of times md-value-send(*)$_p$ has been invoked at sender process p, and initially this is 0. The variable send_buff is a FIFO queue with elements of the form ($M_{ID} \times (T \times V) \times$ TYPES)$\times$S, and initially this is empty. State variable mID∈$M_{ID}$ holds a unique message identifier corresponding to an invocation of the protocol, initially (0,p). Variable currMsg holds the message that is being sent, initially an empty message.

MD-VALUE-SERVER$_s$ has the following state variables. The state variable failed is initially set to false. The variable status is a map from keys in $M_{ID}$ to a value in {ready, sending, delivered}. The variable content is a map from keys in $M_{ID}$ to a message in $F_q$, initially ⊥. The variable outQueue is a FIFO queue with elements of the form $M_{ID} \times (V \cup F_q) \times$ TYPES, initially empty.

Transitions: In MD-VALUE-SENDER$_p$ the input action md-value-send(t,v)$_p$ invokes the protocol with tag t and value v, and the output transition md-value-send-ack(t,v)$_p$ occurs when all the messages with t and v are sent. The action send(*)$^p$ adds messages to the channels. Automaton MD-VALUE-SERVER$_s$ has two input actions recv(*)*$_{,s}$ corresponding to the "full" and "coded" types for receiving the values and coded elements, respectively, and the action send(*)$_s$ sends message to other servers through the channels. The output action md-value-deliver(t,c)$_s$ delivers the tag t and coded element c corresponding to server s.

Explanation of the Protocol: The basic idea of the MD-VALUE implementation is as follows: the sender p∈W invokes input action md-value-send(t,v)$_p$ at the automaton MD-VALUE-SENDER$_p$. The tag t="full" and value v are sent to the set of first f+1 servers D={$s_1, s_2, \ldots, s_{f+1}$} among the set of all servers. Recall that in our model, it is assumed an ordering of the n servers in the system, and hence it makes sense to talk about the first f+1 servers. Further, the message m=(t,v) is sent to the servers respecting the ordering of the servers, i.e., p sends m to $s_i$ before sending to $s_{i+1}$, 1≤i≤f.

Next, MD-VALUE-SERVER$_s$, s∈S is explained. In this, first consider the case when s=$s_i$∈D={$s_i$, 1≤i≤f+1}. In this case, the server $s_i$ upon receiving m for the first time, sends m to every process in the set {$s_{i+1}, s_{i+2}, \ldots, s_{f+1}$}. Once again, the message is sent to these f+1−i servers respecting the ordering of the servers. As a second step, the server $s_i$, for every server s'∈S\D, computes the coded element $c_{s'}=\phi_{s'}(v)$ and sends the message (t="coded",$c_{s'}=\phi_{s'}(v)$) to the server s'. Finally, the server $s_i$ computes its own coded element $c_{s_i}=\phi_{s_i}(v)$ and delivers it locally via the output action md-value-deliver(t,$c_{s_i}$)$_{s_i}$. In the case when s∈S−D, the server s simply delivers the received coded-element $c_s$ via the output action md-value-deliver(t,$c_s$)$_s$.

FIG. 9 is a flow diagram showing processes, in accordance with the embodiment of FIG. 1, for a crash fault-tolerant method of dispersing, to a plurality of servers, a message containing a value to be stored ("md-value-send"). The method begins in a process 91, in which a writer (such as a writer 20) sends a message m toward the first f+1 servers. The message includes the value v to be stored, and a tag t that represents a version or sequence number for the value. The value v encodes or represents a single file, object, or other semantically-identifiable collection of data for which fault-tolerant storage in the system is desired.

The method continues in a process 92, in which each non-faulty one of the first f+1 servers receives the tagged value message. FIG. 9 shows the process 92 as performed by a single such server, say server i, where 1≤i≤f+1. It should be appreciated that processes 92-96 are performed by each of the first f+1 servers, generally concurrently. As will be demonstrated below, the order in which such concurrent processing occurs in each such server does not affect the logical correctness of the method.

A further process 93 in server i determines whether server i is receiving the message m for the first time. If not, then server i takes as given that it already has processed the message m, so no further processing is required, and the method terminates, as indicated. However, if message m is arriving at server i for the first time, the method proceeds to a process 94.

The process 94 ensures that the message eventually will be processed by every one of the non-faulty servers in the plurality of n servers, by sending the identical message m to each server in the first f+1 servers. It can be shown that including this process 94 in the method results in communication overhead on the order of $f^2$, which advantageously is independent of the number n in the plurality of servers. Moreover, from the precondition that no more than f servers have failed, it can be shown that including the process 94 in the method results in every non-failed server processing the message m, even if the initial sender process 91 fails after only any one such non-failed server has been contacted.

The method of FIG. 9 concludes with storing the value v in accordance with erasure coding, represented by processes 95-99. Thus, in a process 95, server i encodes the value v to produce a coded element $c_j$ for each server j not in the first f+1 servers, and sends the tag t and the coded element $c_j$ to each respective server j. Server i concludes its implementation of the method in process 96, in which it performs the same computation for itself, and delivers the message $(t, c_j)$ to itself for local storage processing, which is described above in connection with FIG. 5.

Since at least one of the first f+1 servers is guaranteed to perform the process 95, each of the remaining n−f+1 servers, say server j, is guaranteed to receive the message $(t, c_j)$ in process 97. As above, it should be appreciated that processes 97-99 are performed by each of the last n−f+1 servers, generally concurrently, and are shown only with respect to a single server j. To ensure that each of the latter subset of servers does not process the message multiple times, a process 98 determines whether the server j is receiving the message $(t, c_j)$ for the first time. As above, if not, then server j takes as given that it already has processed the message m, so no further processing is required, and the method terminates, as indicated. Otherwise, the server j delivers the message $(t, c_i)$ to itself for local storage processing, which is described above in connection with FIG. 5.

FIG. 10 is a flow diagram showing processes for a crash fault-tolerant method of dispersing, to the plurality of servers, a message containing metadata ("md-meta-send"). The MD-META primitive ensures that if a server s∈S delivers some metadata m, from a metadata alphabet $M_m$, then it is delivered at every non-faulty server s'∈S. The primitive is defined via the events md-meta-send$(m)_p$ and md-meta-deliver$(m)_p$. The difference with respect to the MD-VALUE primitive is that, while MD-VALUE delivered the corresponding coded-elements at all the servers, here the transmitted message m is itself delivered. Thus, the implementation of MD-META primitive is in fact simpler; the main difference is that while sending messages to the servers in S–D by a server $s_i$∈D, $s_i$ simply sends m, whereas in MD-VALUE protocol the server calculated and sent the corresponding coded elements.

It should be appreciated that, while the method of FIG. 10 is described herein as applying to the processing of metadata in connection with the storage and retrieval of data, it may be viewed as a generalization of the method of FIG. 9 to provide crash fault-tolerance for distribution and delivery of data messages to a plurality of n servers in support of other applications. Indeed, the method of FIG. 10 is somewhat simpler than that of FIG. 9, in that it does not expressly call for erasure coding to be performed on data contained within the message m; such processing, or specific processing of another nature, may be performed in the delivery processes 106, 109 described below. FIG. 9 is described separately to demonstrate that certain processing prior to forwarding messages may reduce the amount of data that must be communicated using the data communication network. A person having ordinary skill in the art may understand how other pre-processing (or post-processing) may be employed advantageously in other applications.

The method of FIG. 10 begins with processes 101-104 that are similar to processes 91-94 of FIG. 9, in that they guarantee at least one of the first f+1 servers processes the message m. Thus, in a first process 101, a sender sends a message m to each of the first f+1 servers, which receives it in a process 102, determines in a process 103 whether it was received for the first time, and if so, forwards it in a process 104 to each of the other first f+1 servers.

The method of FIG. 10 differs from that of FIG. 9 in the next process 105, which sends the original message m (without erasure coding) to each of the last n−f+1 servers, and in the following process 106, which delivers the original message m (without erasure coding) to itself for local processing. The remaining processes 107-109 are similar to the processes 97-99 of FIG. 9, in that process 107 receives the message m, process 108 determines whether the server j received it for the first time, and if so, process 109 delivers it for local processing in the server j. In this way, every non-failed server in the plurality of n servers receives delivery of the message m for local processing, in a crash fault-tolerant manner.

Figure 11:
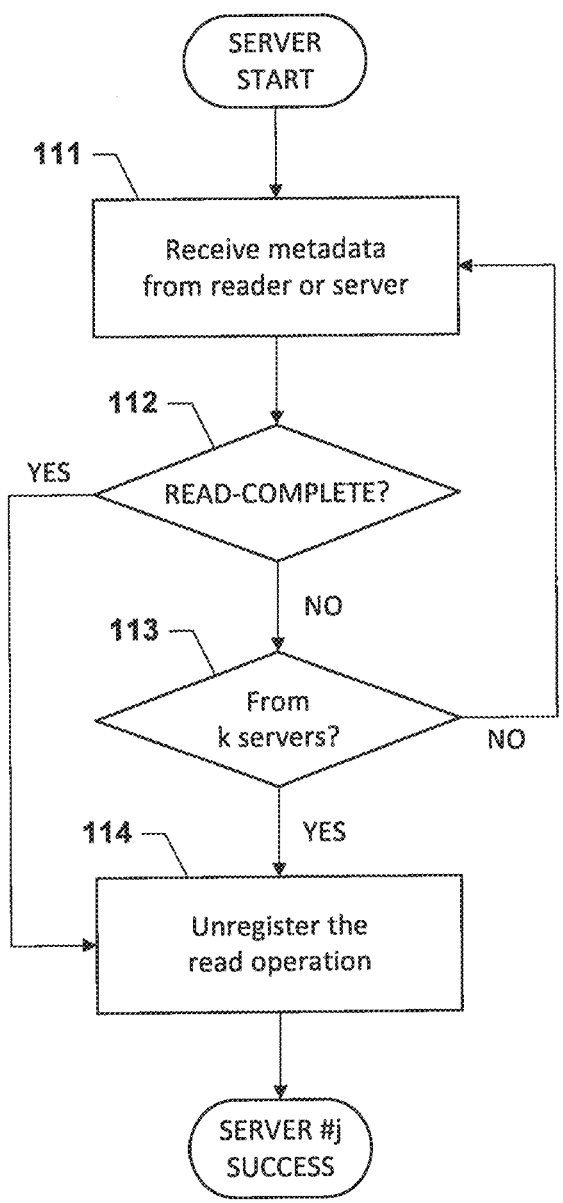
FIG. 11 is a flow diagram of an illustrative reader-unregister operation.

FIG. 11 illustrates processing, by each server, of metadata updates received from readers and from other servers. A storage server may receive metadata updates from readers in the form of read-complete messages, as described in process 65 above in connection with FIG. 6. Additionally, a storage server may receive metadata updates from other storage servers in the form of read-disperse messages, as described in processes 53 and 75 above in connection with FIGS. 5 and 7, respectively. These metadata updates are used advantageously to ensure that server state variables are not needlessly accumulated, and that the computing resources used to maintain such variables are freed up at the earliest possible moment.

Thus, in a first process 111, a first storage server receives metadata from a reader or another storage server. Next, in a process 112, the first storage server discriminates between types of messages. In connection with the algorithms and processes described above, if the message is a read-complete message from a reader, then the storage server must unregister the read operation, as described below in connection with process 114. Otherwise, the message is a read-disperse message from another server.

As is known in the art, if a value v is stored using an [n, k] MDS code, then a reader may decode the value from k different coded elements. Moreover, as disclosed above in processes 53 and 75 in connection with various embodiments, each time a tagged, coded element is delivered to a reader, such delivery is communicated using a crash fault-tolerant manner to each data storage server in the data storage system. Using this mechanism, once any given storage server receives an indication that k different storage servers (counting itself) have communicated to a particular reader their respective coded elements for a given value v and a given tag t, the given storage server can take as fact that the associated reader has sufficient data to decode the value v, and thus may delete its own state information related to such decoding and unregister the read operation. Such an indication is determined in process 113.

The storage server unregisters the read operation in process 114. In connection with the state variables described above, this process 114 may include, for example, deleting all tuples (t, s, r), where r identifies the reader in question. Alternately, if no such tuples exist, then the process 114 may include storing a tuple (t0, s, r), where t0 is an empty tag, to record that a read operation completed for the reader with respect to the stored value v.

Finally, having described above the functions performed by various embodiments, the required components inside a data storage server are described. Referring now to FIG. 12, a storage node (or server) 120 may be the same as or similar to nodes 11 and 22 described above in conjunction with FIGS. 1, 2A-2C, and 3A-3B. Such a storage node 120 includes a reader interface 121, which facilitates interaction between readers (e.g. readers 13 of FIG. 1) and other elements (e.g. processing elements) of node 120. The storage node 120 also includes a writer interface 122, which facilitates interaction between writers (e.g. writers 13 of FIG. 1) and other elements (e.g. processing elements) of node 120. The storage node 120 further includes a server interface 123 which facilitates interaction between storage node 120 and other storage nodes (e.g. data storage network 11a-11d of FIG. 1).

During a write operation (e.g. as described above in conjunction with FIGS. 2, 4-5, and 9), a writer initiates a write operation to the storage node 120 via writer interface 122. As explained above in conjunction with FIG. 2, the writer sends the tagged value (t, v) to a first plurality of storage nodes, and it should be noted that FIG. 12 illustrates the elements in a single one of the storage nodes. Thus, as illustrated in FIG. 2B, node i forwards the tagged value (t, v) to nodes i+1 to f+1 via value-disperse processor 124 and server interface 123.

A coding processor 126 also receives the value v from the writer interface 122. Coding processor 126 generates coded elements according to the MDS encoding, and forwards them to other storage nodes, as illustrated in FIG. 2C. The coded elements delivered locally are stored in a coded element memory 127 in association with the received tag t, which is itself stored in a tag memory 125.

During a read operation (e.g. as described above in conjunction with FIGS. 3, 6-7, and 10), a reader requests or otherwise communicates the need to obtain a particular coded element from the storage node 120 via reader interface 121. As explained above in conjunction with FIGS. 5 and 5A, the reader sends such a request to node 120 and to all non-faulty storage nodes by sending a tag query to all non-faulty nodes.

In response to receiving a tag query, storage node 120 (and all non-faulty nodes) send the tag with the highest version from tag memory 125 to the reader via reader interface 121. Subsequently, the reader registers itself in the reader registry 128, as explained in connection with process 71 of FIG. 7. After registration, further writes received by the writer interface 122 automatically trigger relays of a tagged, coded element pair from storage 125, 127 to the reader via the value-disperse processor 124 and the reader interface 121. That is, if a write operation of the same file being read occurs during the read operation, the storage node 120 ensures that the most up to date version of the file is forwarded to the reader, by consultation with the reader registry 128. Thus, the reader receives the most current version of the requested file. Moreover, further metadata updates (e.g. as described in connection with processes 53, 62, 65, and 75) received at the server interface 123 cause the storage node to update its metadata, which are stored in a metadata memory 129. The updated metadata are managed according to the algorithms described above.

Having described preferred embodiments which serve to illustrate various concepts, systems circuits and techniques, which are the subject of this patent, it will now become apparent to those of ordinary skill in the art that other embodiments incorporating these concepts, systems circuits and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

It should thus be appreciated that elements of different embodiments described herein may be combined to form other embodiments which may not be specifically set forth herein. Various elements, which are described in the context of a single embodiment, may also be provided separately or in any suitable sub-combination. Other embodiments not specifically described herein are also within the scope of the following claims.

It is felt, therefore that the concepts, systems, circuits and techniques described herein should not be limited by the above description, but only as defined by the spirit and scope of the following claims which encompass, within their scope, all such changes and modifications.

All publications and references cited herein are expressly incorporated herein by reference in their entirety.

What is claimed is:

1. A data storage node for a data storage system having a plurality of logically numbered data storage nodes, of which at most f are faulty, the data storage node comprising:
    a node interface configured for:
        receiving a message that is associated with a reader and includes a tag that is totally orderable with respect to other such tags, and
        responsive to a first receiving of the message, if the logical number of the data storage node is no greater than f+1, forwarding the message to each data storage node having a logical number greater than that of the data storage node;
    a coding processor configured for computing a coded element from a version of a value that is uniquely identified by the tag;
    a tag memory configured for storing the tag;
    a coded element memory configured for storing the computed coded element;
    a reader registry configured for registering the stored tag in association with the reader; and
    a reader interface configured for, responsive to a first receiving of the message and when the tag is not higher ordered than a given tag previously stored in the tag memory, sending to the reader the given tag and a previously stored coded element computed from a version of a value that is uniquely identified by the given tag.

2. A data storage node according to claim 1, wherein the node interface is further configured to inform each other data storage node in the plurality about such sending to the reader by the reader interface.

3. A data storage node according to claim 1, wherein:
    the coding processor is configured for computing the coded element according to both an encoding scheme and the logical number of the data storage node; and
    the node interface is further configured to replace, within the message, the version of the value to be written by the coded element.

4. A data storage node according to claim 3, wherein the message includes a tag that is totally orderable with respect to other such tags, and wherein the reader interface is further configured to relay the tag and the coded element to a reader when the tag is at least as highly ordered as a tag previously registered in association with the reader in the reader registry.

5. A data storage node according to claim 4, wherein the node interface is further configured to inform each other data storage node in the plurality about such relaying of the tag and the coded element by the reader interface.

6. A data storage node according to claim 4, wherein the tag memory and the coded element memory are further configured for storing the tag and the coded element, respectively, when the tag is higher ordered than a tag previously stored in the tag memory.

7. A data storage network comprising a plurality of logically numbered data storage nodes, of which at most f are faulty, wherein each of the data storage nodes in the plurality is configured to:
respond to a first receiving of a message, that pertains to a data storage protocol, is associated with a reader, and includes a tag that is totally orderable with respect to other such tags, by:
(a) if the logical number of the data storage node is no greater than f+1, forwarding the message to each data storage node having a logical number greater than that of the data storage node; and
(b) processing the message according to the data storage protocol, including registering the tag in association with the reader, and when the tag is not higher ordered than a previously stored tag, sending to the reader the previously stored tag and a previously stored coded element computed from a version of a value uniquely identified by the previously stored tag.

8. A data storage network according to claim 7, wherein each of the data storage nodes in the plurality is further configured to inform each other data storage node in the plurality about such sending to the reader.

9. A data storage network according to claim 7, wherein:
processing the message by each of the data storage nodes in the plurality comprises replacing within the message the version of the value to be written by the coded element computed therefrom according to both an encoding scheme and the logical number of the data storage node; and
forwarding the message includes, for each data storage node having a logical number greater than f+1, replacing within the message the version of the value to be written by the coded element.

10. A data storage network according to claim 9, wherein the message includes a tag that is totally orderable with respect to other such tags, and wherein processing the message by each of the data storage nodes in the plurality includes relaying the tag and the coded element to a reader when the tag is at least as highly ordered as a tag previously registered in association with the reader.

11. A data storage network according to claim 10, wherein each of the data storage nodes in the plurality is further configured to inform each other data storage node in the plurality about such relaying of the tag and the coded element.

12. A data storage network according to claim 10, wherein processing the message by each of the data storage nodes in the plurality further includes storing the tag and the coded element when the tag is higher ordered than a previously stored tag.

13. A data storage network according to claim 9, wherein the data storage nodes are logically numbered 1 through n, and the encoding scheme uses an [n, k] Maximum Distance Separable (MDS) code, where $k \leq n-f$.

14. A method of operating a data storage node, in a data storage network having a plurality of logically numbered data storage nodes, of which at most f are faulty, the method comprising:
responding to a first receiving of a message, that pertains to a data storage protocol, is associated with a reader, and includes a tag that is totally orderable with respect to other such tags, by:
(a) if the logical number of the data storage node is no greater than f+1, forwarding the message to each data storage node having a logical number greater than that of the data storage node; and
(b) processing the message according to the data storage protocol, including registering the tag in association with the reader, and when the tag is not higher ordered than a previously stored tag, sending to the reader the previously stored tag and a previously stored coded element computed from a version of a value uniquely identified by the previously stored tag.

15. A method according to claim 14, wherein the data storage node is further configured to inform each other data storage node in the plurality of data storage nodes about such sending to the reader.

16. A method according to claim 14, wherein:
processing the message by each of the data storage nodes in the plurality comprises replacing within the message the version of the value to be written by the coded element computed therefrom according to both an encoding scheme and the logical number of the data storage node; and
forwarding the message includes, for each data storage node having a logical number greater than f+1, replacing within the message the version of the value to be written by the coded element.

17. A method according to claim 16, wherein the message includes a tag that is totally orderable with respect to other such tags, and wherein processing the message includes relaying the tag and the coded element to a reader when the tag is at least as highly ordered as a tag previously registered in association with the reader.

18. A method according to claim 17, further comprising the data storage node informing each other data storage node in the plurality of data storage nodes about such relaying of the tag and the coded element.

19. A method according to claim 17, wherein processing the message further includes storing the tag and the coded element when the tag is higher ordered than a previously stored tag.

20. A method according to claim 16, wherein the data storage nodes are logically numbered 1 through n, and the encoding scheme uses an [n, k] Maximum Distance Separable (MDS) code, where $k \leq n-f$.

* * * * *